(12) United States Patent
Said

(10) Patent No.: US 11,876,969 B2
(45) Date of Patent: Jan. 16, 2024

(54) NEURAL-NETWORK MEDIA COMPRESSION USING QUANTIZED ENTROPY CODING DISTRIBUTION PARAMETERS

(71) Applicant: QUALCOMM Incorporated, San Diego, CA (US)

(72) Inventor: Amir Said, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/814,426

(22) Filed: Jul. 22, 2022

(65) Prior Publication Data

US 2023/0262222 A1 Aug. 17, 2023

Related U.S. Application Data

(60) Provisional application No. 63/267,857, filed on Feb. 11, 2022.

(51) Int. Cl.
*H04N 19/13* (2014.01)
*H04N 19/42* (2014.01)
*H04N 19/124* (2014.01)
*H04N 19/134* (2014.01)
*H04N 19/136* (2014.01)

(52) U.S. Cl.
CPC ........... *H04N 19/13* (2014.11); *H04N 19/124* (2014.11); *H04N 19/134* (2014.11); *H04N 19/136* (2014.11); *H04N 19/42* (2014.11)

(58) Field of Classification Search
CPC .... H04N 19/13; H04N 19/124; H04N 19/134; H04N 19/136; H04N 19/42
See application file for complete search history.

(56) References Cited

U.S. PATENT DOCUMENTS

| | | | |
|---|---|---|---|
| 6,421,467 B1* | 7/2002 | Mitra | G06F 18/23211 382/240 |
| 2003/0108099 A1* | 6/2003 | Nagumo | G06T 9/20 375/E7.199 |
| 2010/0074356 A1* | 3/2010 | Ashikhmin | H04L 25/03343 375/267 |
| 2012/0232913 A1* | 9/2012 | Terriberry | G10L 19/038 704/E21.001 |

(Continued)

OTHER PUBLICATIONS

Brummer B., et al., "End-to-end Optimized Image Compression with Competition of Prior Distributions", arxiv.org, Cornell University Library, 201 Olin Library Cornell University Ithaca, NY 14853, Nov. 17, 2021, XP091100718, 6 Pages.

(Continued)

*Primary Examiner* — Joseph Suh
(74) *Attorney, Agent, or Firm* — Shumaker & Sieffert, PA

(57) ABSTRACT

This disclosure describes entropy coding techniques for media data coded using neural-based techniques. A media coder is configured to determine a probability distribution function parameter for a data element of a data stream coded by a neural-based media compression technique, wherein the probability distribution function parameter is a function of a standard deviation of a probability distribution function of the data stream, determine a code vector based on the probability distribution function parameter, and entropy code the data element using the code vector.

20 Claims, 30 Drawing Sheets

(56) References Cited

U.S. PATENT DOCUMENTS

| | | | |
|---|---|---|---|
| 2013/0094831 A1* | 4/2013 | Suzuki | G11B 27/11 386/230 |
| 2015/0179166 A1* | 6/2015 | Nagao | G06F 18/295 704/221 |
| 2019/0265955 A1* | 8/2019 | Wolf | G06F 11/36 |
| 2020/0027247 A1* | 1/2020 | Minnen | G06T 9/002 |

OTHER PUBLICATIONS

International Search Report and Written Opinion—PCT/US2023/060543—ISA/EPO—dated Mar. 24, 2023.
Said A., et al., "Optimized Learned Entropy Coding Parameters for Practical Neural-Based Image and Video Compression", arxiv.org, Cornell University Library, 201 Olin Library Cornell University Ithaca, NY 14853, Jan. 20, 2023, XP091419131, 5 Pages.
Zhao J., et al., "A Universal Encoder Rate Distortion Optimization Framework for Learned Compression", 2021 IEEE/CVF Conference on Computer Vision and Pattern Recognition Workshops (CVPRW), IEEE, Jun. 19, 2021, pp. 1880-1884, XP033967384, 5 Pages, Retrieved on Aug. 25, 2021.
Balle J., et al., "Variational Image Compression with A Scale Hyperprior", arXiv:1802.01436v2 [eess.IV] May 1, 2018, pp. 1-23.
Bross B., et al.,"Developments in International Video Coding Standardization After AVC, with an Overview of Versatile Video Coding (VVC)", Proceedings of the IEEE, vol. 109, No. 9, Sep. 2021, pp. 1463-1493.
Cao J., et al., "Extreme Learning Machine with Affine Transformation Inputs in an Activation Function", IEEE Transactions on Neural Networks and Learning Systems, vol. 30, No. 7, Jul. 2019, pp. 2093-2107.
Dimitriadis S., et al., "Revealing Cross-Frequency Causal Interactions during a Mental Arithmetic Task through Symbolic Transfer Entropy: A Novel Vector-Quantization Approach", IEEE Transactions on Neural Systems and Rehabilitation Engineering: A Publication of the IEEE Engineering in Medicine and Biology Society, Sep. 2016, 13 Pages, DOI: 10.1109/TNSRE.2016.2516107, URL: https://www.researchgate.net/publication/291187046.
Ding D., et al., "Advances in Video Compression System Using Deep Neural Network: A Review and Case Studies", Proceedings of the IEEE, vol. 109, No. 9, Sep. 2021, pp. 1494-1520.
Gabrie M., et al., "Entropy and Mutual Information in Models of Deep Neural Networks", 32nd Conference on Neural Information Processing Systems (NeurIPS 2018), Montreal, Canada, 2018, pp. 1-11.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Kingma D.P., et al., "An Introduction to Variational Autoencoders", Foundations and Trends in Machine Learning, arXiv:1906.02691v3 [cs.LG] Dec. 11, 2019, 89 pgs.
Kingma D.P., et al., "Auto-Encoding Variational Bayes", ICLR 2014 Conference, Dec. 2013, pp. 1-14, arXiv preprint arXiv:1312.6114v10 [stat.ML] May 1, 2014.
Ma S., et al., "Image and Video Compression with Neural Networks: A Review", arxiv.org, IEEE Transactions on Circuits and Systems for Video Technology, Cornell University Library, 201 OLIN Library Cornell University Ithaca, NY 14853, Apr. 10, 2019, XP081165996, pp. 1-16.
Pearlman W.A., et al., "Digital Signal Compression: Principles and Practice", Cambridge University Press, 2011, 439 pages.
Qualcomm: "World's First Software-Based Neural Video Decoder Running HD Format in Real-Time on a Commercial Smartphone [Video] Qualcomm AI Research demonstrates 1280x704 HD video being decoded real-time at 30+ frames per second on Snapdragon 888", Jun. 17, 2021, pp. 1-6.
Said A., "Arithmetic Coding", Chapter 5, 2003, pp. 101-152.
Said A., "Introduction to Arithmetic Coding—Theory and Practice", Technical Report, Apr. 21, 2004, pp. 1-67, Retrieved from the Internet: URL: http://www.hpl.hp.com/techreports/2004/HPL-2004-76.pdf.

\* cited by examiner

```c
const uint8_t code_index[256] = {
 0,  1,  2,  3,  4,  5,  6,  7,  8,  9, 10, 11, 11, 12, 12, 13,
13, 14, 15, 15, 16, 16, 17, 17, 18, 18, 19, 19, 19, 19,
19, 20, 20, 20, 21, 21, 21, 22, 22, 22, 22, 22,
22, 23, 23, 23, 23, 24, 24, 24, 25, 25, 25, 25,
25, 27, 27, 26, 26, 26, 26, 26, 26, 27, 27,
27, 27, 27, 28, 28, 28, 28, 28, 29, 29, 29, 29,
29, 29, 29, 30, 30, 31, 31, 31, 31, 31, 31, 31,
31, 32, 32, 32, 32, 32, 32, 33, 33, 33, 33, 33,
33, 34, 34, 34, 34, 34, 34, 34, 34, 35, 35, 35,
35, 35, 35, 35, 35, 35, 36, 36, 36, 36, 36, 36,
36, 36, 37, 37, 37, 37, 37, 37, 37, 37, 37, 37,
38, 38, 38, 38, 38, 38, 38, 38, 38, 38, 39, 39,
39, 39, 39, 39, 39, 39, 39, 39, 40, 40, 40, 40,
40, 40, 40, 40, 40, 40, 41, 41, 41, 41, 41, 41,
41, 41, 41, 41, 42, 42, 42, 42, 42, 42, 42, 42,
42, 42, 42, 42, 42, 42, 42, 42,
};
```

FIG. 16

```c
const uint8_t code_index[256] = {
    0,  1,  2,  2,  3,  3,  4,  4,  4,  5,  5,  5,  6,  6,  6,  6,
    7,  7,  7,  8,  8,  8,  8,  9,  9,  9,  9,  9,  9,  9,  9, 10,
   10, 10, 10, 10, 11, 11, 11, 11, 11, 11, 11, 11, 11, 11, 11, 12,
   12, 12, 12, 12, 13, 13, 13, 13, 13, 13, 13, 13, 13, 13, 13, 13,
   13, 14, 14, 14, 14, 14, 14, 14, 14, 14, 14, 14, 14, 14, 14, 14,
   15, 15, 15, 15, 15, 15, 15, 15, 16, 16, 16, 16, 16, 16, 16, 16,
   16, 16, 16, 16, 16, 16, 16, 16, 17, 17, 17, 17, 17, 17, 17, 17,
   17, 17, 17, 17, 17, 17, 17, 17, 18, 18, 18, 18, 18, 18, 18, 18,
   18, 18, 18, 18, 18, 18, 18, 18, 19, 19, 19, 19, 19, 19, 19, 19,
   19, 19, 19, 19, 19, 19, 19, 19, 20, 20, 20, 20, 20, 20, 20, 20,
   20, 20, 20, 20, 20, 20, 20, 20, 20, 21, 21, 21, 21, 21, 21, 21,
   21, 21, 21, 21, 21, 21, 21, 21, 22, 22, 22, 22, 22, 22, 22, 22,
   22, 22, 22, 22, 22, 22, 22, 22, 22, 22, 22, 22, 22, 22, 22, 22,
   23, 23, 23, 23, 23, 23, 23, 23, 23, 23, 23, 23, 23, 23, 23, 23,
   24, 24, 24, 24, 24, 24, 24, 24, 24, 24, 24, 24, 24, 24, 24, 24,
   24, 24, 24, 24, 24, 24, 24, 24, 24, 24, 24, 24, 24, 24, 24, 24 };
```

FIG. 18

NEURAL-NETWORK MEDIA COMPRESSION USING QUANTIZED ENTROPY CODING DISTRIBUTION PARAMETERS

This application claims the benefit of U.S. Provisional No. 63/267,857, filed Feb. 11, 2022, the entire content of which is incorporated by reference herein.

TECHNICAL FIELD

This disclosure relates to media encoding and decoding, including the encoding and decoding of images and video data.

BACKGROUND

Digital media capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

SUMMARY

In general, this disclosure describes techniques for media compression, including techniques for video and/or image encoding and decoding. Media (e.g., images and/or video) compression methods based on neural networks can be competitive to current standards and provide several additional advantages. Neural-based coding methods are commonly designed and tested using high-precision floating-point arithmetic. However, as the technology moves to practical deployment, neural network weights and activation functions are typically quantized and represented with low-precision integers in order to improve speed and power consumption.

This disclosure addresses the problems that occur when the neural network variables related to entropy coding are quantized. Neural network variables are important to the design of a neural-based video/image compression scheme because such variables define compression efficiency. Furthermore, the very specific properties of the entropy coding variables are not taken into account by general tools for optimizing quantization in neural networks. Testing has shown that the worst quantization effects can occur exactly on some of the most common use cases, and the losses caused by the worst quantization effects cannot be recovered by re-training the neural network.

This disclosure describes techniques to optimize the definition of the trained entropy coding variables, so that the information that is most important for effective entropy coding is best preserved when represented with low-precision integers. Testing has also shown how the techniques described herein can be used to minimize the amount of memory needed for entropy coding. This disclosure describes a general approach for entropy coding design, as well as specific solutions and implementations for the commonly used Gaussian distributions. The techniques of this disclosure can be generally applied to any neural-based compression techniques, but the examples described below focus on techniques for images and video.

In one example, a method includes determining a probability distribution function parameter for a data element of a data stream coded by a neural-based media compression technique, wherein the probability distribution function parameter is based on a distribution of the data stream optimized for quantization, determining a code vector based on the probability distribution function parameter, and entropy coding the data element using the code vector. This function may be determined empirically (e.g., logarithmic) or by using an algorithm that evaluates coding redundancy or the solution of an ordinary differential equation.

In another example, a device includes a memory, and one or more processors in communication with the memory, the one or more processors configured to determine a probability distribution function parameter for a data element of a data stream coded by a neural-based media compression technique, wherein the probability distribution function parameter is based on a distribution of the data stream optimized for quantization, determine a code vector based on the probability distribution function parameter, and entropy code the data element using the code vector. This function may be determined empirically (e.g., logarithmic) or by using an algorithm that evaluates coding redundancy or the solution of an ordinary differential equation.

In another example, a computer-readable storage medium is encoded with instructions that, when executed, cause a programmable processor to determine a probability distribution function parameter for a data element of a data stream coded by a neural-based media compression technique, wherein the probability distribution function parameter is based on a distribution of the data stream optimized for quantization, determine a code vector based on the probability distribution function parameter, and entropy code the data element using the code vector. This function may be determined empirically (e.g., logarithmic) or by using an algorithm that evaluates coding redundancy or the solution of an ordinary differential equation.

The details of one or more examples are set forth in the accompanying drawings and the description below. Other features, objects, and advantages will be apparent from the description, drawings, and claims.

BRIEF DESCRIPTION OF DRAWINGS

FIG. 16 illustrates example code for converting a quantized probability distribution function parameter to a code vector.

FIG. 18 illustrates another example code for converting a quantized probability distribution function parameter to a code vector.

DETAILED DESCRIPTION

This disclosure describes techniques for encoding and decoding media data (e.g., images or videos) using neural-network-based media coding techniques. In particular, this disclosure describes techniques for the entropy coding of media data using optimized probability distribution function (PDF) parameterizations. In particular, this disclosure describes techniques for neural-network-based media coding that uses optimized PDF parameterizations for quantization. Example techniques of this disclosure include the definition and implementation of a quantized modified PDF parameter that is a non-uniform (e.g., logarithmic) function of a PDF parameter (e.g., in general a standard deviation or any parameter commonly used to define a statistical distribution) used to train the neural networks. By using the PDF parameters of this disclosure, the entropy coding of media data using neural-based coding techniques may be performed with greater efficiency, using less memory, and the performance of the neural-based coding techniques is much less degraded when the neural network weights, activations, and outputs are represented by low-precision integers.

Figure 1:
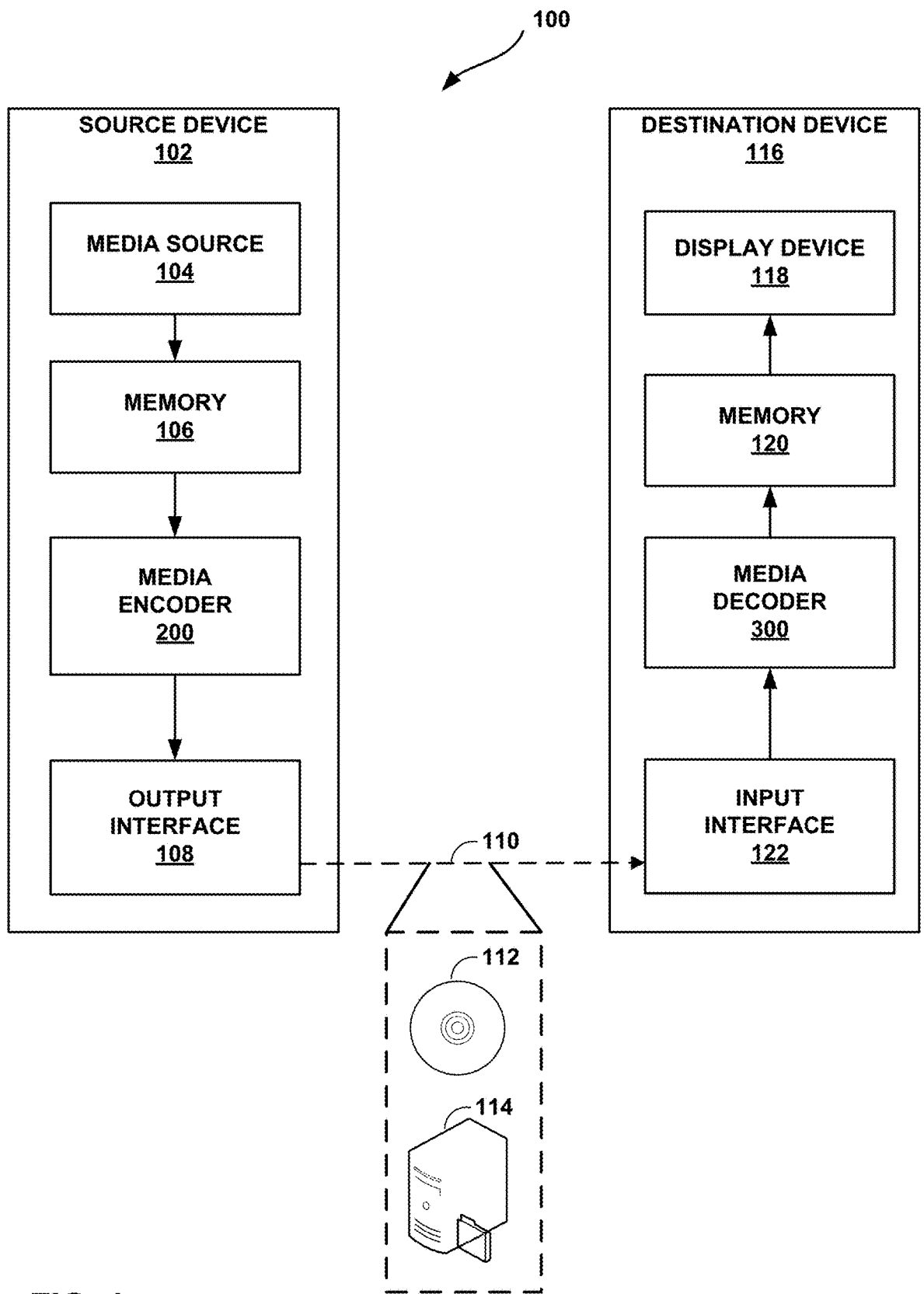
FIG. 1 is a block diagram illustrating an example media encoding and decoding system that may perform the techniques of this disclosure.

FIG. 1 is a block diagram illustrating an example media encoding and decoding system 100 that may perform the techniques of this disclosure. In the context of this disclosure, media may include any digital file to be compressed, including video data and/or images. The example techniques of this disclosure are generally directed to coding (encoding and/or decoding) video data and/or image data. While examples of FIG. 1 will be described with reference to media encoding and decoding, the techniques of this application are equally applicable to the encoding and decoding of any type of data file using neural-based compression techniques.

As shown in FIG. 1, system 100 includes a source device 102 that provides encoded media data to be decoded and displayed by a destination device 116, in this example. In particular, source device 102 provides the media data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes media source 104, memory 106, media encoder 200, and output interface 108. Destination device 116 includes input interface 122, media decoder 300, memory 120, and display device 118. In accordance with this disclosure, media encoder 200 of source device 102 and media decoder 300 of destination device 116 may be configured to apply the techniques for entropy coding a neural-based media compression system. Thus, source device 102 represents an example of a media encoding device, while destination device 116 represents an example of a media decoding device. In other examples, a source device and a destination device may include other components or arrangements. For example, source device 102 may receive media data from an external media source, such as an external camera. Likewise, destination device 116 may interface with an external display device, rather than include an integrated display device.

System 100, as shown in FIG. 1, is merely one example. In general, any digital media encoding and/or decoding device may perform techniques for entropy coding a neural-based media compression system. Source device 102 and destination device 116 are merely examples of such coding devices in which source device 102 generates coded media data for transmission to destination device 116. This disclosure refers to a "coding" device as a device that performs coding (encoding and/or decoding) of data. Thus, media encoder 200 and media decoder 300 represent examples of coding devices, in particular, a media encoder and a media decoder, respectively. In some examples, source device 102 and destination device 116 may operate in a substantially symmetrical manner such that each of source device 102 and destination device 116 includes media encoding and decoding components. Hence, system 100 may support one-way or two-way media transmission between source device 102 and destination device 116, e.g., for video streaming, video playback, video broadcasting, or video telephony.

In general, media source 104 represents a source of media data (i.e., raw, unencoded media data) and provides a sequential series of pictures (also referred to as "frames") of the media data to media encoder 200, which encodes data for the pictures. Media source 104 of source device 102 may include a video capture device, such as a video camera, a video archive containing previously captured raw video, and/or a video feed interface to receive video from a video content provider. As a further alternative, media source 104 may generate computer graphics-based data as the source media, or a combination of live media, archived media, and computer-generated media. In each case, media encoder 200 encodes the captured, pre-captured, or computer-generated media data. Media encoder 200 may rearrange the pictures from the received order (sometimes referred to as "display order") into a coding order for coding. Media encoder 200 may generate a bitstream including encoded media data. Source device 102 may then output the encoded media data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw media data, e.g., raw media from media source 104 and raw, decoded media data from media decoder 300. Additionally or alternatively, memories 106, 120 may store software instructions executable by, e.g., media encoder 200 and media decoder 300, respectively. Although memory 106 and memory 120 are shown separately from media encoder 200 and media decoder 300 in this example, it should be understood that media encoder 200 and media decoder 300 may also include internal memories for functionally similar or equivalent purposes. Furthermore, memories 106, 120 may store encoded media data, e.g., output from media encoder 200 and input to media decoder 300. In some examples, portions of memories 106, 120 may be allocated as one or more buffers, e.g., to store raw, decoded, and/or encoded media data.

Computer-readable medium 110 may represent any type of medium or device capable of transporting the encoded media data from source device 102 to destination device 116. In one example, computer-readable medium 110 represents a communication medium to enable source device 102 to transmit encoded media data directly to destination device 116 in real-time, e.g., via a radio frequency network or computer-based network. Output interface 108 may modulate a transmission signal including the encoded media data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded media data.

In some examples, source device 102 may output encoded media data to file server 114 or another intermediate storage device that may store the encoded media data generated by source device 102. Destination device 116 may access stored media data from file server 114 via streaming or download.

File server 114 may be any type of server device capable of storing encoded media data and transmitting that encoded media data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded media data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded media data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded media data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded media data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to media encoder 200 and/or output interface 108, and destination device 116 may include an SoC device to perform the functionality attributed to media decoder 300 and/or input interface 122.

The techniques of this disclosure may be applied to media coding in support of any of a variety of multimedia applications, such as over-the-air television broadcasts, cable television transmissions, satellite television transmissions, Internet streaming media transmissions, such as dynamic adaptive streaming over HTTP (DASH), digital media that is encoded onto a data storage medium, decoding of digital media stored on a data storage medium, or other applications.

Input interface 122 of destination device 116 receives an encoded media bitstream from computer-readable medium 110 (e.g., a communication medium, storage device 112, file server 114, or the like). The encoded media bitstream may include signaling information defined by media encoder 200, which is also used by media decoder 300. Display device 118 displays decoded pictures of the decoded media data to a user. Display device 118 may represent any of a variety of display devices such as a liquid crystal display (LCD), a plasma display, an organic light emitting diode (OLED) display, or another type of display device.

Although not shown in FIG. 1, in some examples, media encoder 200 and media decoder 300 may each be integrated with an audio encoder and/or audio decoder, and may include appropriate MUX-DEMUX units, or other hardware and/or software, to handle multiplexed streams including both audio and media in a common data stream.

Media encoder 200 and media decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of media encoder 200 and media decoder 300 may be included in one or more encoders or decoders, either of which may be integrated as part of a combined encoder/decoder (CODEC) in a respective device. A device including media encoder 200 and/or media decoder 300 may comprise an integrated circuit, a microprocessor, and/or a wireless communication device, such as a cellular telephone.

Image and video (e.g., media) compression methods based on neural networks can be competitive to current standards and provide several additional advantages. In some examples, neural-based coding methods are commonly designed and tested using high-precision floating-point arithmetic. However, use of high-precision floating point arithmetic may impact deployment due to high processing time and power consumption. As the technology moves to practical deployment, neural network weights and activation functions are typically quantized and represented with low-precision integers in order to improve speed and power consumption.

That is, for practical deployment, neural network variables (e.g., weights and activation functions) may be quantized. However, there may be issues with quantizing of neural network variables.

This disclosure describes example techniques that may address the problems that occur when the neural network variables related to entropy coding are quantized. Neural network variables related to entropy coding are important to the design of a neural-based video/image compression scheme because such variables define compression efficiency. Furthermore, the very specific properties of the entropy coding variables are not taken into account by general tools for optimizing quantization in neural networks. Testing has shown that, in fact, the worst quantization effects can occur exactly on some of the most common use cases, and the losses caused by the worst quantization effects cannot be recovered by re-training the neural network.

This disclosure describes techniques that further optimize the definition of the entropy coding variables so that the information that is most important for effective entropy coding is best preserved. Testing has also shown how the techniques described herein can be used to minimize the amount of memory needed for entropy coding. This disclosure describes a general approach for entropy coding design, as well as specific solutions and implementations for the commonly used Gaussian distributions.

As will be explained in more detail below, media encoder 200 and media decoder 300 may be configured to determine a probability distribution function parameter for a data element of a data stream coded by a neural-based media compression technique, wherein the probability distribution function parameter is based on a distribution of the data stream optimized for quantization, determine a code vector based on the probability distribution function parameter, and entropy code the data element using the code vector. This function may be determined empirically (e.g., logarithmic) or by using an algorithm that evaluates coding redundancy or the solution of an ordinary differential equation.

Entropy coding is a fundamental part of media compression systems. The entropy coding process is responsible for optimizing the conversions between media information and the compressed data bitstreams, aiming to obtain the most compact representation possible. Unlike other elements of media compression, entropy coding is a lossless process, i.e., it fully preserves information.

Several techniques were developed for implementing efficient entropy coding in image and video compression standards. More recently it has been shown that new compression methods based on deep learning and neural networks are approaching the performance of conventional methods, while offering several other practical advantages.

Figure 2:
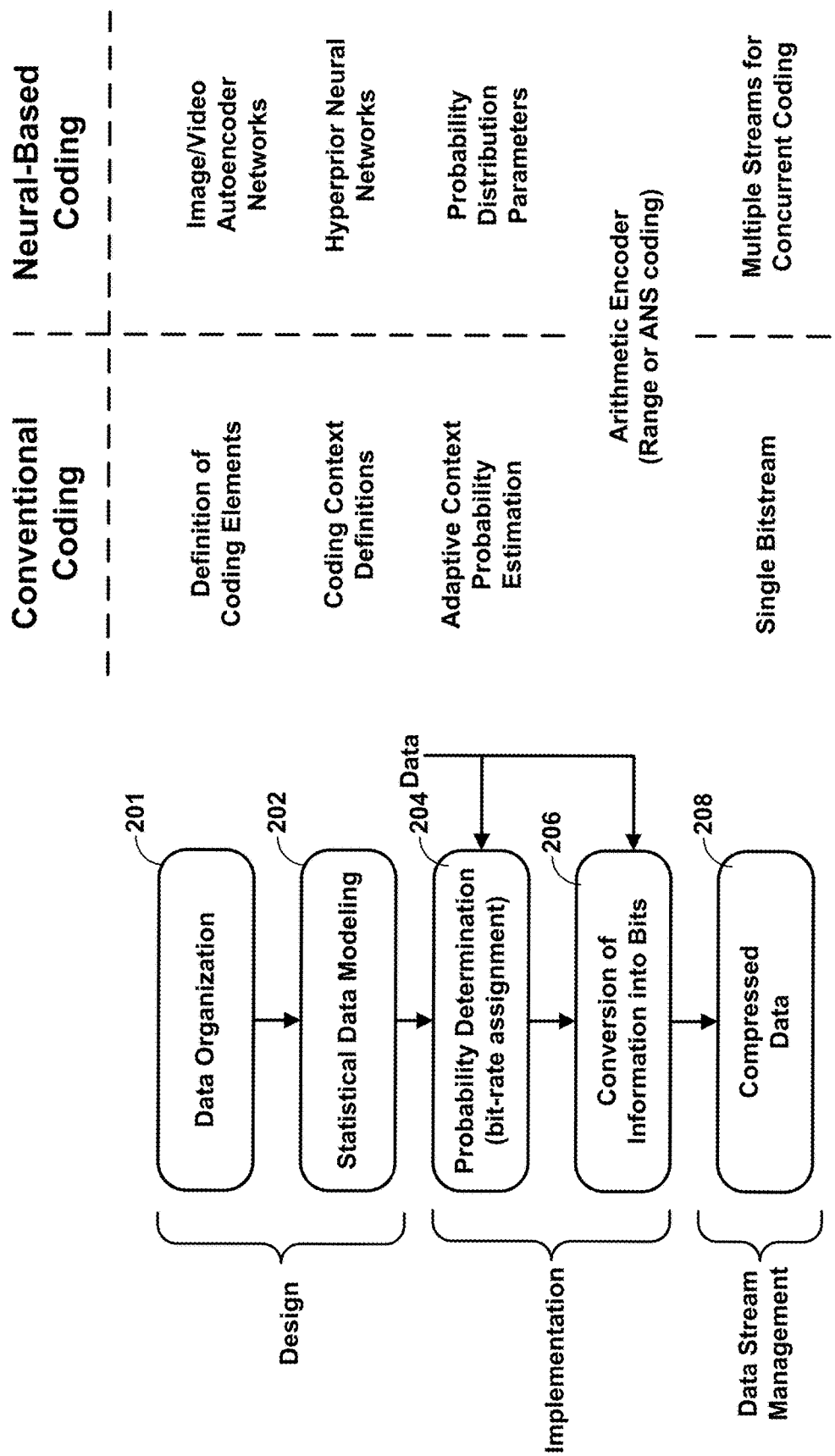
FIG. 2 illustrates differences being conventional media coding and neural-based media coding.

Because conventional and neural-based codecs use very distinct forms of compression, conventional and neural-based codecs employ entropy coding in significantly different ways. A summary of the main differences is shown in FIG. 2, where it can be observed that, even if the two approaches use the same coding method, like arithmetic coding, all the other aspects are different. This means that it is beneficial to develop new techniques to optimize the performance in neural-based codecs.

As shown in FIG. 2, the design phase of both conventional and neural-based coding techniques include data organization process 201 and statistical data modeling process 202. For conventional media coding techniques, such as H.265, data organization process 201 includes the definition of coding elements (e.g., syntax elements and coding modes). For neural-based coding processes, data organization process 201 includes the training and development of image/video (e.g., media) autoencoder networks. For statistical data modeling process 202, conventional coding techniques include the coding of context definitions, e.g., for an entropy coding process, such as context-adaptive binary arithmetic coding. For neural-based coding processes, statistical data modeling process 202 includes the development and training of a hyperprior neural network.

Both conventional and neural-based coding techniques include an implementation phase that includes probability determination process 204 and conversion of information into bits process 206. Both the probability determination process 204 and conversion of information into bits process 206 are based on the data to be coded. For conventional coding, probability determination process 204 (e.g., a bitrate assignment process) includes adaptive context probability estimation. For neural-based coding, probability determination process 204 includes the determination of probability distribution parameters, as will be described in more detail below. Both the conventional and neural-based coding techniques use an arithmetic and/or entropy coder (e.g., or arithmetic or entropy encoder or decoder) for the conversion of information into bits process 206. The arithmetic coder may be a Huffman, range or asymmetric numeral system (ANS) coding.

The data stream management phase is the management of compressed data 208. In some example conventional coding systems, the compressed data is in a single bitstream. Some example neural-based coding systems use multiple streams for concurrent coding.

A main entropy coding principle, derived from basic information theory principles, is that the optimal number of bits $N_b$ to be assigned for coding a data symbol is:

$$N_b = -\log_2(\hat{p}), \quad (1)$$

where $\hat{p}$ is the estimated probability of the value of the symbol to be encoded, with knowledge of $\hat{p}$ shared by the encoder and decoder (e.g., media encoder 200 and media decoder 300). This optimal number for the average number of bits is a fractional number, but it can be effectively achieved in practice using arithmetic coding.

Symbol probabilities can vary widely and frequently, depending on the specific parts of the media content. Thus, in conventional media compression, one of the most important tasks is the efficient estimation of those data symbol probabilities, and how to accurately update the data symbol probabilities as they change during coding. Since this probability estimation is done sequentially, it can be difficult to parallelize entropy coding on conventional video coding methods.

Figure 3:
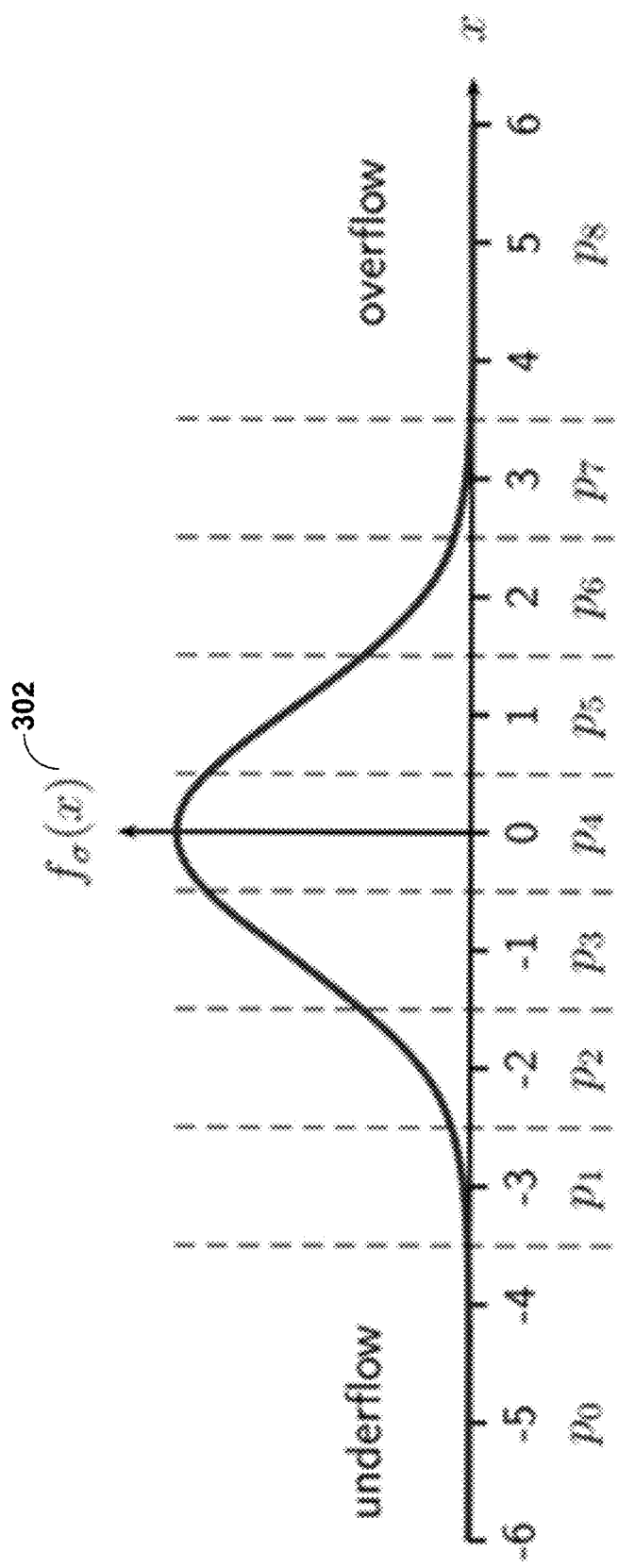
FIG. 3 illustrates an example of a Gaussian continuous probability distribution function.

Compression methods proposed for neural-based codecs are designed to work with the assumption that the data to be compressed has a certain type of probability density function (PDF) and only the parameters defining this function can vary. As one example, the PDF can be chosen to have all variables with independent zero-mean Gaussian distributions, each with a different standard deviation σ. This may not simply be an empiric assumption since the networks "learn" to make it real. The PDF is typically, but not always, Gaussian, as shown in the example of FIG. 3. FIG. 3 illustrates an example of a Gaussian continuous PDF 302 commonly used in neural-based codecs, the quantized values, and respective probabilities ($p_0, p_1, \ldots, p_8$). Multiple values corresponding to rare underflow and overflow cases are typically coded sub-optimally with methods that do not require probability estimates.

In general, the standard deviation parameter σ is a scaling factor for a "template" distribution. For example, the Gaussian or Laplace with zero mean and unit variance are templates, and there are scaling parameters to "stretch" or "shrink" the template. Commonly the standard deviation is used because of its convenience, but it could be any factor. This disclosure defines techniques that change from a parameter or scale factor that is convenient for humans (e.g., traditionally used by statisticians) to one that is optimized for entropy coding using low-precision parameter representations.

In some examples, a separate neural network (e.g., separate from the neural network that performs the media compression) is trained to determine the parameters of the distributions. Details of this training will be described below. Before entropy coding, those variables are discretized with a fixed quantization scheme, and the probabilities of the discrete values ($p_0, p_1, \ldots, p_8$, in the example of FIG. 3), are derived from the assumed distribution, and later used for determining the number of symbol bits according to eq. (1).

Unlike conventional coding methods where it is typically necessary to estimate the probabilities for all possible values of each data symbol, neural-based methods may rely solely on the parameters of the PDF (e.g., standard deviation σ), which are computed in parallel using neural networks, making concurrent entropy coding much easier to implement, without compression loss. Since entropy coding is defined by values of those PDF parameters, compression performance can be severely degraded when the PDF parameters are represented with low integer precision. This disclosure describes new techniques that minimize those compression losses.

Figure 4:
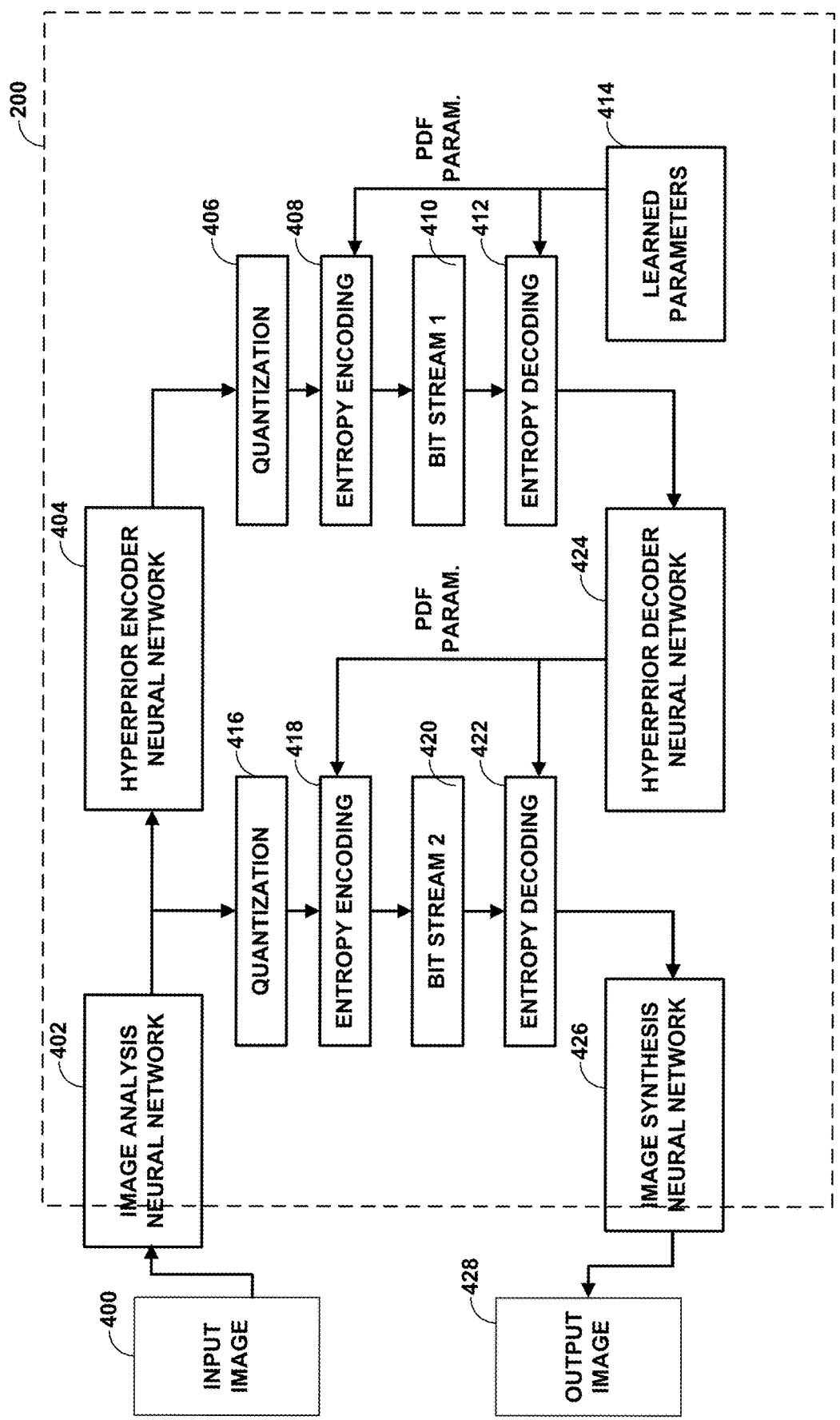
FIG. 4 is a block diagram illustrating an example neural-based image codec.

One important class of methods proposed for neural-based image and video compression adapts the variational autoencoder architecture, where the latent variables are quantized and entropy coded using fixed learned distributions. In some examples, this architecture has been extended by adding a smaller neural network, called hyperprior, that uses the variables generated from the autoencoder to define the probability distributions to be used for entropy coding those autoencoder variables. This hyperprior network also uses quantization and entropy coding, but with pre-defined (e.g., learned) PDF parameters. FIG. 4 is a diagram of a neural image codec using variational autoencoder and hyperprior networks for entropy coding.

The process shown in FIG. 4, where the neural networks for image analysis and synthesis implement the variational autoencoder, and entropy coding of its variables is defined by the hyperprior decoder network (used at both sender and receiver). Since encoder and decoder (e.g., media encoder 200 and media decoder 300) have been used to denote autoencoder parts, in the neural network literature it is common to refer to the systems traditionally called by those names as sender and receiver, respectively.

In FIG. 4, media encoder 200 may include image analysis neural network 402, hyperprior encoder neural network 404, quantization process 406, entropy encoding process 408, quantization process 416, and entropy encoding process 418. Media encoder 200 may also include entropy decoding process 412, hyperprior decoder neural network 424, entropy decoding process 422, and image synthesis neural network 426 (which may be similar to a reconstruction loop in a hybrid video coder). Though not shown, media decoder 300 may include similar structures to entropy decoding process 412, hyperprior decoder neural network 424, entropy decoding process 422, and image synthesis neural network 426.

Image analysis neural network 402 is a neural network configured to encode and/or compress input image 400. The compressed data stream created by image analysis neural network 402 is then processed by hyperprior encoder neural network 404. The output of hyperprior encoder neural network 404 is then quantized by quantization process 406 and entropy coded by entropy encoding process 408 to create bitstream 1 410. Hyperprior encoder neural network 404 is part of the process configured to determine parameters (e.g., a standard deviation) of a PDF for the data stream created by image analysis neural network 402. The parameters of the PDF may then be used to entropy encode the data stream from image analysis neural network 402.

Entropy encoding process 408 itself uses PDF parameters (e.g., learned parameter 414) that are learned from a plurality of images to be encoded. Entropy decoding process 412 uses the same PDF parameters to entropy decode bitstream 1 410. This entropy decoded bitstream is then processed by hyperprior decoder neural network 424 in order to generate the PDF parameters for the specific image (e.g., input image 400) being decoded.

The PDF parameters generated by hyperprior decoder neural network 424 are then used by entropy encoding process 418 to encode the data stream produced by image analysis neural network 402 after quantization by quantization process 416. Entropy encoding process 418 create bitstream 2 420. Bitstream 2 420 is then entropy decoded by entropy decoding process 422 using the same PDF parameters from hyperprior decoder neural network 424. After entropy decoding, image synthesis neural network 426 processes the decoded data to produce output image 428.

Figure 5:
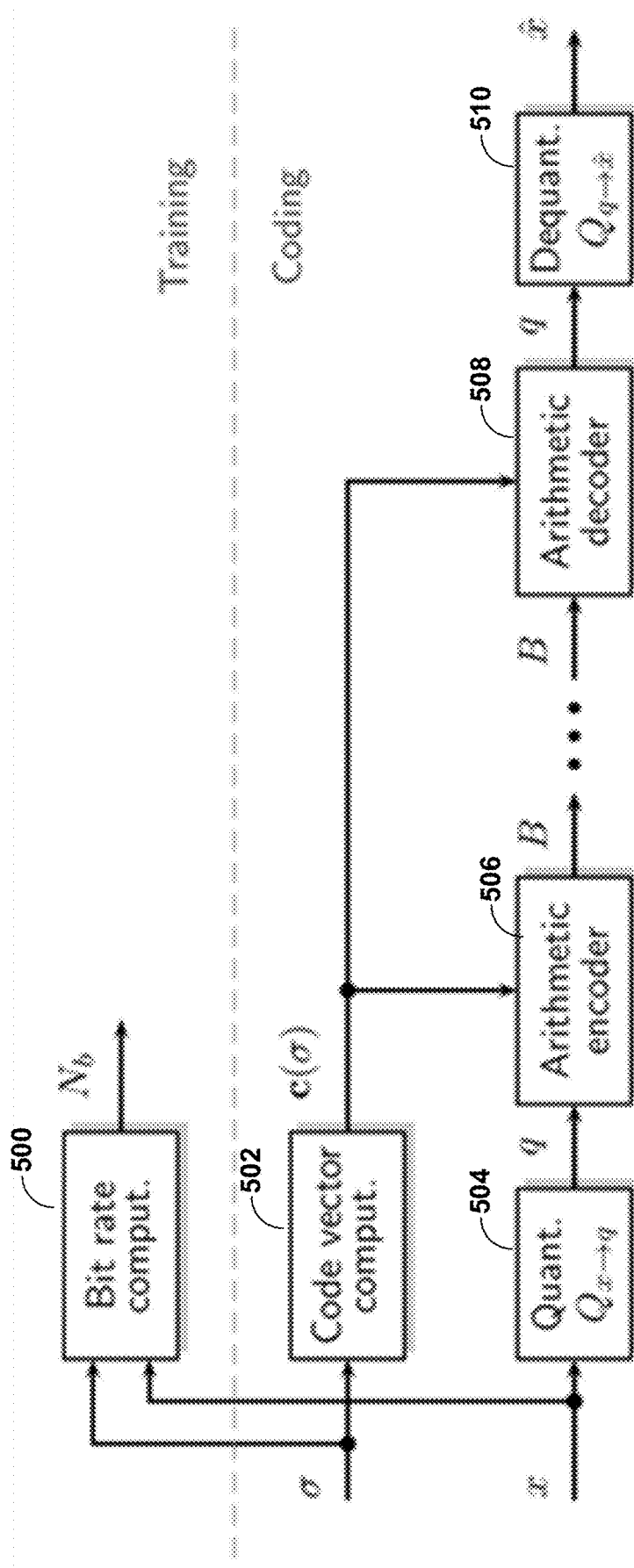
FIG. 5 illustrates an example implementation of neural-based entropy coding.

FIG. 5 provides a more detailed diagram of the coding process of a single data element denoted by x. In particular, FIG. 5 illustrates an implementation of entropy coding using arithmetic coding, where x is the data to be coded, and vector of PDF parameters σ, known by the sender and receiver (e.g., media encoder 200 and media decoder 3), contains the parameters that define the PDF of x. More specifically, the vector σ is standard deviation (e.g., of a normal gaussian distribution), and more generally is a parameter determined by the hyperprior network to determine the PDF to use for entropy coding.

In the context of this disclosure, data elements (x) may include inputs to a neural network (e.g., inputs to image synthesis neural network 426 of FIG. 4), outputs of a neural network (e.g., outputs of image analysis neural network 402 of FIG. 4), syntax elements, or other coded data of an encoded media bitstream. Some example types of data that may be encoded to generate data elements x (or more generally, data elements to be entropy coded using the techniques of this disclosure) in neural-based image/video coding may include RGB or YUV pixel values in images or video frames, residuals of pixel values (pixel values minus prediction from motion) in motion compensated video, motion vectors for block-based motion compensation, and/or dense optical flow data for warping-based motion compensation. In other examples, data elements x may include data representing weights, activation functions, or other data used by a neural-based media compression technique.

Data is not encoded during training phase, but rather bit rate computation process 500 uses data element x and PDF parameter σ to estimate the number of bits $N_b$ used by the arithmetic coding process. The vector σ represents the parameter defining the PDF of data elements x, which is known by the sender and receiver (e.g., media encoder 200 and media decoder 300). The PDF parameter σ may be computed by a hyperprior decoder network, or may be read from a table of predefined parameters that are learned. As one example, code vector computation process 502 may compute a code vector c(σ) for a particular data element x from its corresponding PDF parameter σ.

Quantization process ($Q_{x \to q}$) 504 quantizes data element x to create quantized data element q. Arithmetic encoder 506 then uses code vector c(σ) to arithmetically code quantized data element q to create bitstream B. Arithmetic decoder 508 recovers quantized data element q by performing arithmetic decoding using the same code vector c(σ). Dequantization process ($Q_{q \to \hat{x}}$) 510 performs dequantization of quantized data element q to recover decoded data element $\hat{x}$. Decoded data element $\hat{x}$ may then be decoded by a neural-based decoding technique to reconstruct the original media (e.g., a picture or video).

Note that the techniques of this disclosure are applicable to all compression methods containing neural networks that generate parameters of probability distributions used for entropy coding, and also applicable to tables of entropy coding parameters stored with low-precision integers. Even though the next sections frequently use examples where a represents the standard deviation of Gaussian PDFs, the general techniques of this disclosure are applicable for all cases where a PDF is defined by a parameter σ.

A PDF may be defined by more than one parameter, but not all parameters may be directly used for entropy coding. For example, a PDF may be defined by standard deviation σ and mean value μ, but only the standard deviation determines entropy coding properties. Since having one parameter is the most common in practice, it is the assumption used in the next sections, and the techniques described below may be easily generalized.

As shown in FIG. 5, the block called code vector computation process 502 defines how the PDF is used to create a code vector c(σ), which is the information used by the arithmetic coding process to create bit stream B. For example, the code vector can be a vector with the cumulative distribution function (CDF) corresponding to the probability mass function (PMF) defined by symbols after quantization ($p_0, p_1, \ldots, p_8$, in FIG. 3). In another example, if a technique called binarization is used, then code vector c(σ) contains the probabilities of binary decisions to code the same data. In practice, the CDF and probabilities are scaled, so that elements of vector c are represented as integers.

The system shown in FIG. 5 represents how entropy coding is used when a neural-based codec is being first designed, trained, and tested, using very precise floating-point arithmetic and powerful processors. However, in practical implementations, the neural network values are typically represented with low precision integers to enable faster computations and small power usage. This is shown in the modified system of FIG. 6, where an additional quantization block is added to indicate that parameter σ is converted to low precision version $\hat{\sigma}$, represented, for example, as a single 8-bit integer (byte).

Figure 6:
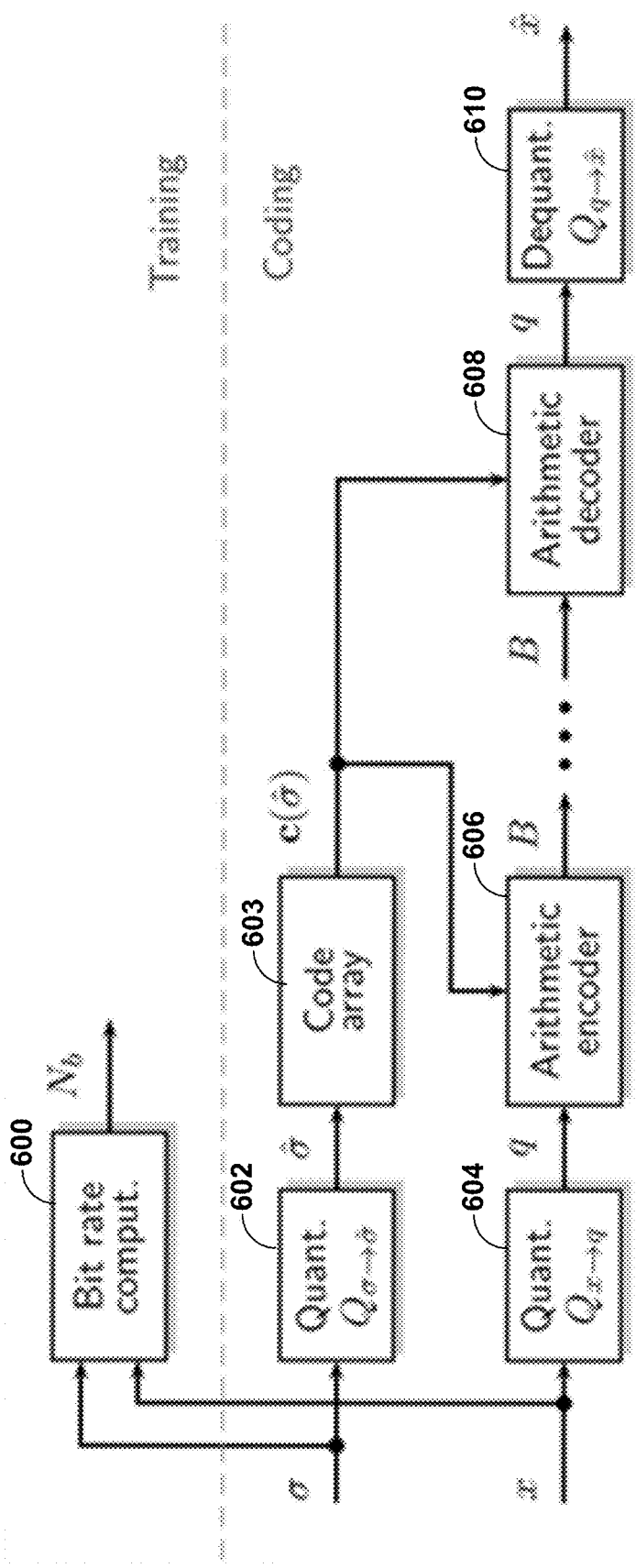
FIG. 6 illustrates an example implementation of neural-based entropy coding with a quantized probability distribution function parameter.

FIG. 6 illustrates a practical implementation of the system of FIG. 5, where PDF parameter σ is quantized and represented by low precision integer $\hat{\sigma}$, and the vectors needed for arithmetic coding are pre-computed and stored in an array with C elements. Like the example of FIG. 5, data is not encoded during training phase, but rather bit rate computation process 600 uses data element x and PDF parameter σ to estimate the number of bits $N_b$ used by the arithmetic coding process. In the example of FIG. 6, quantization process ($Q_{\sigma \to \hat{\sigma}}$) 602 quantizes the PDF parameter σ to create quantized PDF parameter $\hat{\sigma}$. Code array process 603 then generates code vector c($\hat{\sigma}$) from quantized PDF parameter $\hat{\sigma}$. That is, quantized PDF parameter $\hat{\sigma}$ is used to determine one of the C elements (e.g., code vectors) available to be determined by code array process 603.

Quantization process ($Q_{x \to q}$) 604 quantizes data element x to create quantized data element q. Arithmetic encoder 606 then uses code vector c($\hat{\sigma}$) to arithmetically code quantized data element q to create bitstream B. Arithmetic decoder 608 recovers quantized data element q by performing arithmetic decoding using the same code vector c($\hat{\sigma}$). Dequantization process ($Q_{q->}\hat{x}$) 610 performs dequantization of quantized data element q to recover decoded data element $\hat{x}$. Decoded data element $\hat{x}$ may then be decoded by a neural-based decoding technique to reconstruct the original media (e.g., a picture or video).

Note that in FIG. 6, the quantization of x is different than the quantization of PDF parameter $\sigma$. Floating point parameters may work well for complex neural networks, but are not very feasible for widespread use for smaller devices (e.g., mobile devices). Power consumption in such mobile devices may be too high for practical implementation. As such, the PDF parameter $\sigma$ is quantized to an integer for more lower power usage and more practical application. The PDF parameter $\hat{\sigma}$ is a 1 byte integer, in one example (e.g., 256 possible values). Such a quantization leads to more power efficiency.

Another practical modification is motivated by the fact that it is commonly computationally expensive to re-compute code vector c($\sigma$) for each value of x. For example, if x has a Gaussian distribution with standard deviation $\sigma$ (e.g., a typical case), then the PMF of quantized values is defined by:

$$p_\sigma[n] = \frac{1}{2}\left[\text{erf}\left(\frac{n+1/2}{\sqrt{2}\sigma}\right) - \text{erf}\left(\frac{n-1/2}{\sqrt{2}\sigma}\right)\right], \quad (2)$$

where the error function (erf) is:

$$\text{erf}(x) = \frac{2}{\sqrt{\pi}}\int_0^x e^{-t^2} dt. \quad (3)$$

The entropy (H) of this PMF, in bits, is:

$$H(\sigma) = -\sum_{n=-\infty}^{\infty} p_\sigma[n]\log_2(p_\sigma[n]). \quad (4)$$

Note that besides computing probabilities, additional tasks may be performed to create vector c with the correct integer cumulative sums or binary probabilities, adding to the computational costs. Those computations can be avoided in practical implementations by pre-computing code vectors c($\hat{\sigma}$) for different quantized values of parameter $\hat{\sigma}$, and storing those vectors in an array (e.g., in memory). As shown in the diagram of FIG. 6, sender and receiver (e.g., media encoder 200 and media decoder 300) have the same array of code vectors, which are selected according to parameter $\hat{\sigma}$, and used for arithmetic encoding and decoding.

For example, given the following definition:

$$\hat{\sigma}=Q_\sigma(\sigma)=\lfloor\sigma\rfloor, \quad (5)$$

where $\lfloor\sigma\rfloor$ (floor function) is the greatest integer less than or equal to $\sigma$, then x can be entropy coded with pre-computed code vectors c($\hat{\sigma}$)=c($\lfloor\sigma\rfloor$+½).

The loss incurred by having a limited number of code vectors can be measured using the code redundancy function, which is the average number of additional bits needed to encode x using a code vector c(r) instead of the optimal code vector c($\sigma$).

The code redundancy function is defined by the Kullback-Leibler divergence measure, as follows:

$$R(\sigma\,|\,r) = \sum_{n=-\infty}^{\infty} p_\sigma[n]\log_2\left(\frac{p_\sigma[n]}{p_r[n]}\right). \quad (6)$$

Entropy coding is not normally designed to minimize an average redundancy, because media codecs operate on a wide range of bit ratios. Commonly, the average is not known a priori. Instead, entropy coding is designed by limiting the relative redundancy, as follows:

$$L(\sigma\,|\,r) = \frac{R(\sigma\,|\,r)}{H(\sigma)}. \quad (7)$$

Designing entropy coding methods that have strictly limited relative redundancy guarantees that all averages are also limited. In other words, with this approach the average compression losses may not be minimal, but they are guaranteed to be small when relative losses are always small.

Figure 7:
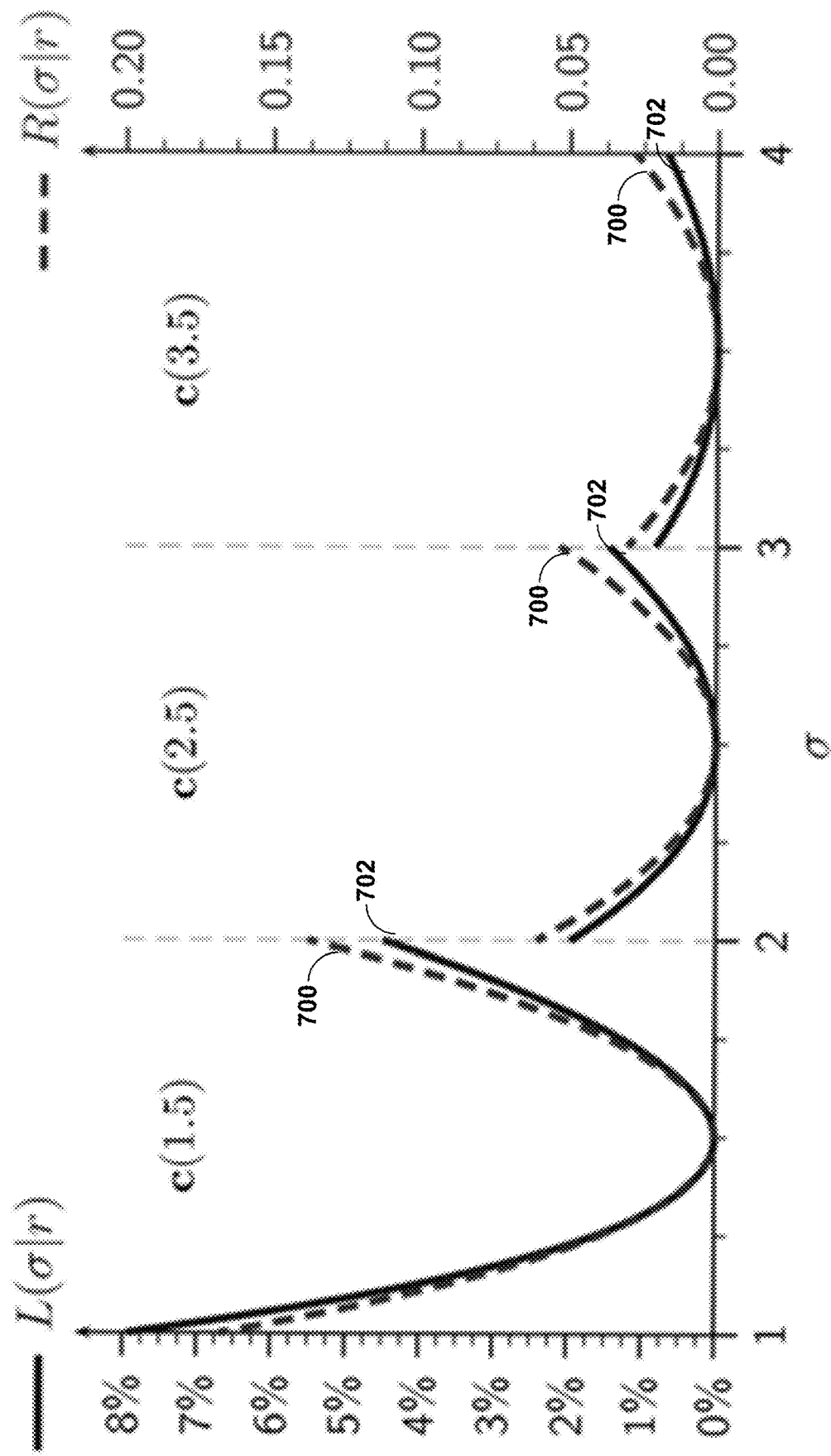
FIG. 7 illustrates example measures of redundancy for quantized probability distribution function parameters for different code vectors.

FIG. 7 shows examples of those redundancy measures for Gaussian distributions when the code vectors are computed using the following:

$$r = \lfloor\sigma\rfloor + \frac{1}{2}. \quad (8)$$

FIG. 7 shows examples of absolute measures (plots 700, right Y axis) and relative measures (plots 702, left Y axis) of redundancy related to the use of quantized PDF parameters and an integer number of code vectors. This loss is coding efficiency. Essentially more bits than necessary are used. Quantizing the sigma value results in uncertainty as to the actual value of the floating point sigma.

It may be assumed that code vectors c(1.5), c(2.5), and c(3.5) are used to entropy code values with PDF parameter $\sigma$ in intervals [1, 2), [2, 3), and [3, 4), respectively. It can be observed that the redundancy is zero when $\sigma$=r, and otherwise positive. Note that, in the example of FIG. 7, the maximum redundancy in interval [1, 2) is larger than in the other intervals.

Testing has shown that the maximum redundancy in an interval depends on the width of the interval, and on the values within the interval. This means that better results can be obtained with non-uniform assignment of code vectors.

Figure 8:
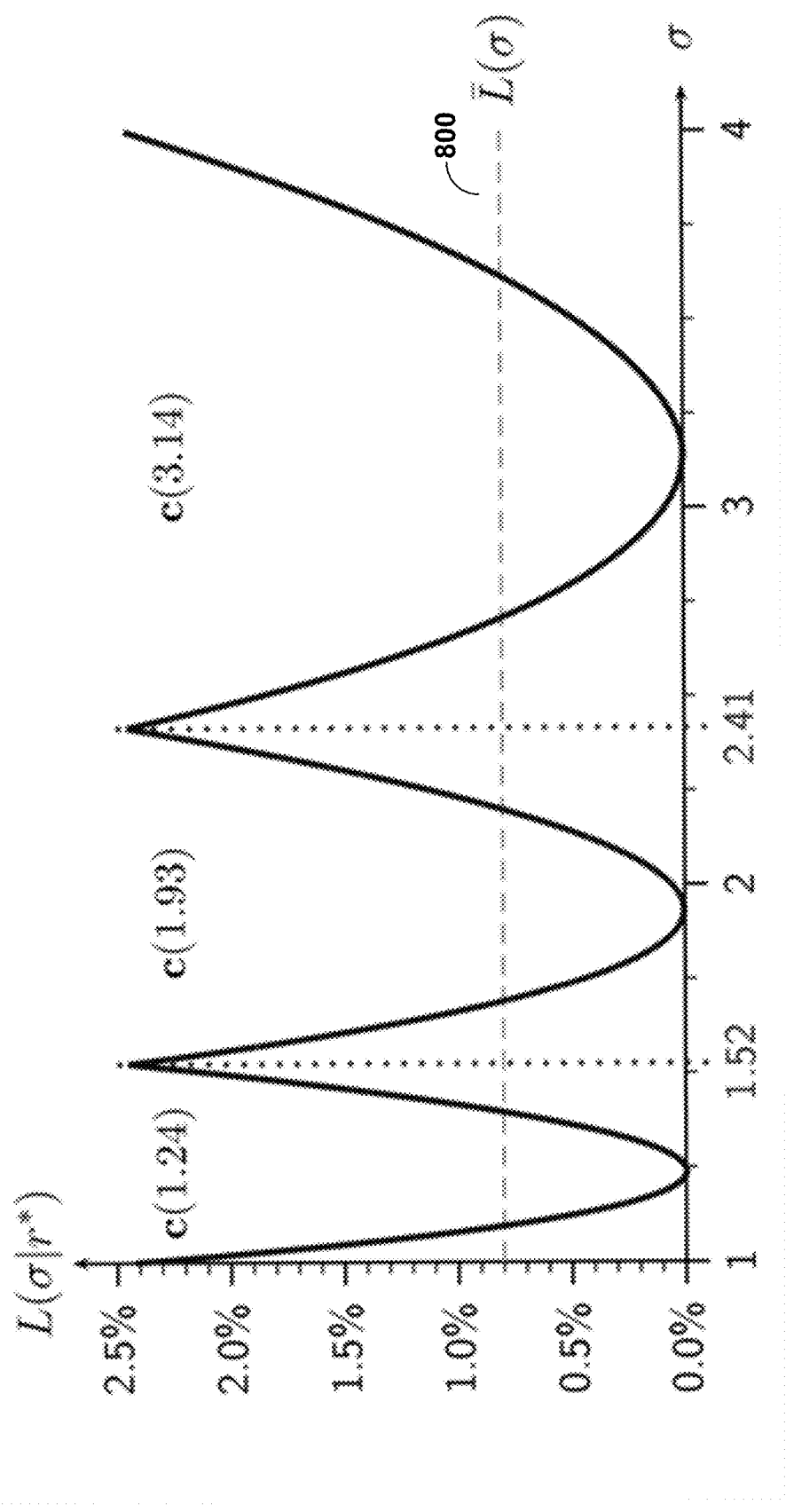
FIG. 8 illustrates an example of non-uniform assignments of code vectors.

FIG. 8 shows an example of non-uniform assignment of code vectors c($\sigma$) designed to obtain same maximum relative redundancy in all intervals. The relative redundancy graphs in FIG. 8 may be obtained if code vectors c(1.24), c(1.93), and c(3.14) are used to entropy code values with PDF parameter $\sigma$ respectively in intervals [1, 1.52), [1.52, 2.41), and [2.41, 4). It can be observed that with those values the maximum relative redundancy is the same in the three intervals.

Note that the techniques described above with reference to FIG. 8 are related to code vector assignments, and not the quantization of PDF parameter $\sigma$. For instance, if $\sigma$ is directly quantized to integer values, then the fractional interval thresholds shown in FIG. 8 cannot be applied.

Given an interval [$\sigma_a$, $\sigma_b$] defining the ranges of $\sigma$ values to be entropy coded with the same code vector c(r*($\sigma_a$, $\sigma_b$)), a media coder (e.g., media encoder 200 and media decoder 300) may minimize the maximum relative redundancy within this interval if the following equation is used:

$$r^*(\sigma_a, \sigma_b) = \{r : L(\sigma_a | r) = L(\sigma_b | r)\}. \quad (9)$$

With the above design criterion for code vectors, it can be observed in FIG. 8 that the redundancy within interval [$\sigma_a$, $\sigma_b$) has a nearly parabolic shape, with zero value when $\sigma = r^*(\sigma_a, \sigma_b)$. Under those conditions, and assuming a uniform conditional distribution of $\sigma$ within the interval, an average redundancy may be well approximated by:

$$\bar{L}(\sigma) = \frac{L(\sigma_a | r^*(\sigma_a, \sigma_b))}{3} = \quad (10)$$

$$\frac{L(\sigma_b | r^*(\sigma_a, \sigma_b))}{3} \approx E_{\sigma \in [\sigma_a, \sigma_b]}\{L(\sigma | r^*(\sigma_a, \sigma_b))\}.$$

This average is shown as dashed line 800 in the example of FIG. 8. FIG. 8 shows that when several intervals have the same maximum redundancies according to eq. (9), then those intervals also have approximately the same average redundancy.

Figure 9:
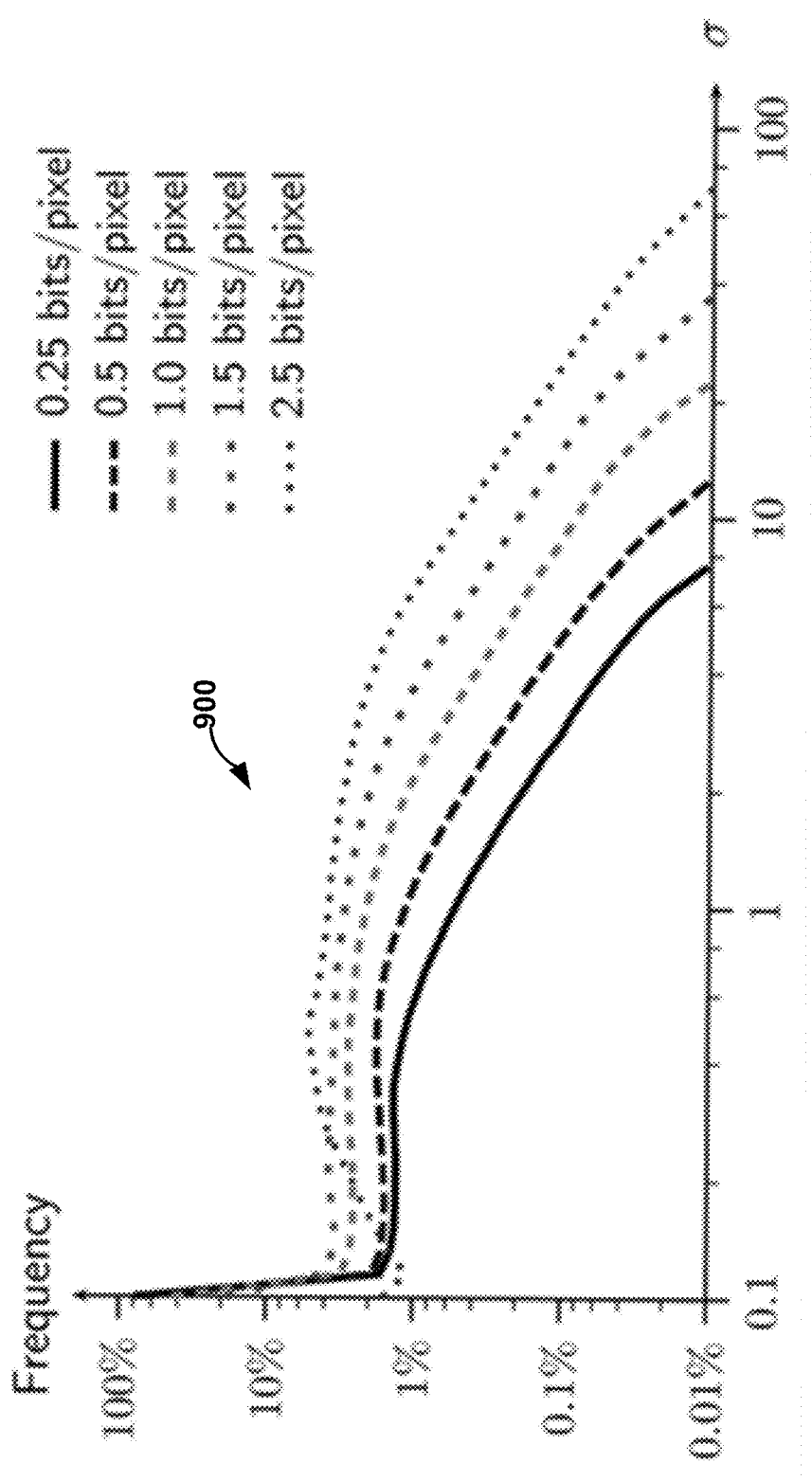
FIG. 9 illustrates an example of a distribution of Gaussian standard deviations according to bit rates.

One fact to be considered for identifying the problems with the implementation shown in FIG. 6 is that codec designers may choose a type of PDF and the parameters to be used for its definition. However, it is the practical application of the design that defines the relative frequencies of parameter values since those are defined by network training. For example, FIG. 9 shows a plot 900 of the relative frequency of Gaussian standard deviation values from a neural-based image codec. As shown in FIG. 9, for low bit rates (the most used in practice), $\sigma$ values are peaked at the smallest allowed value, $\sigma=0.1$, and nearly all are smaller than $\sigma=10$. On the other hand, for larger bit rates, larger $\sigma$ values are more common. This disclosure assumes that, to cover a wide range of reproduction quality, standard deviations are in the range [0.1, 1,000].

Figure 10:
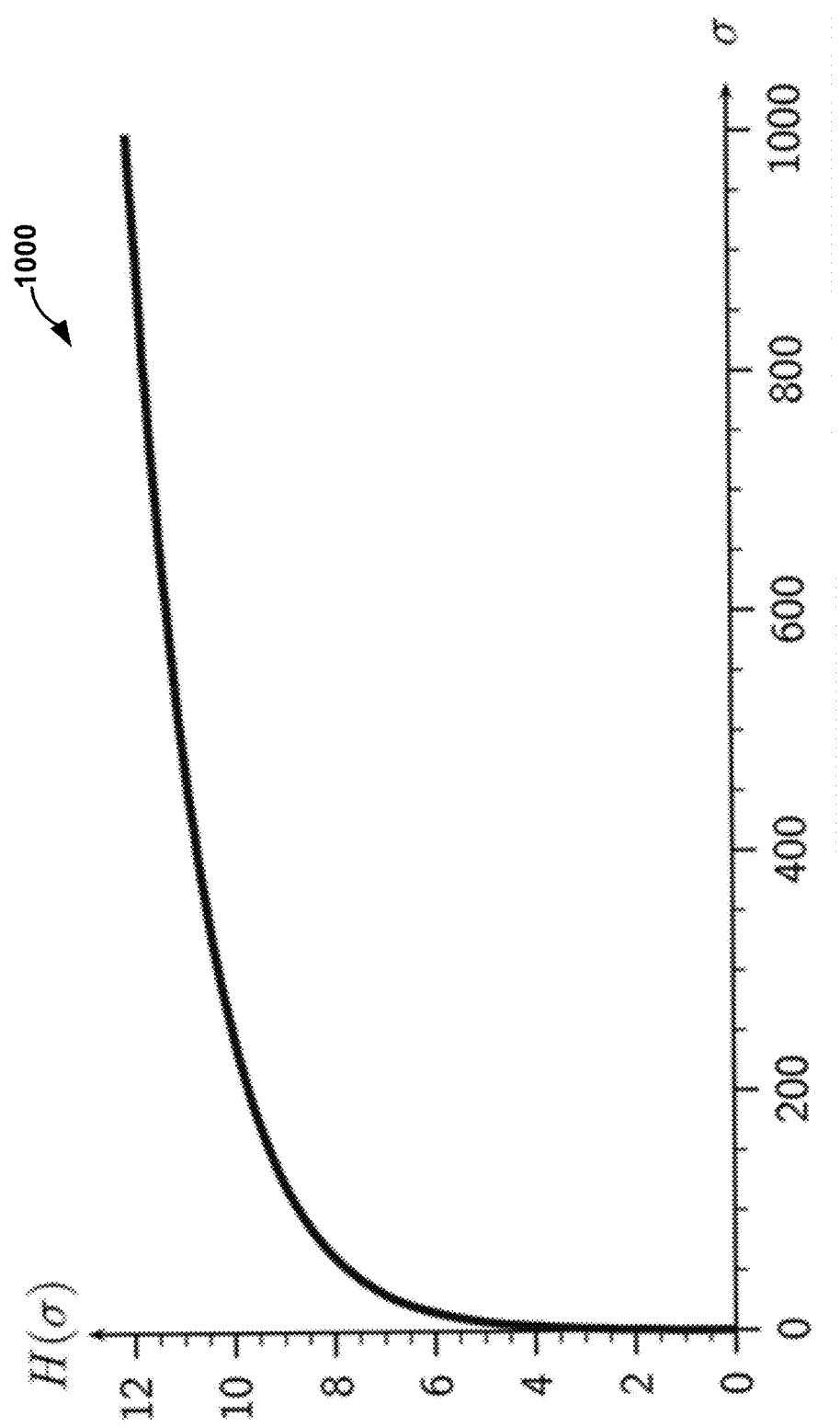
FIG. 10 illustrates an example entropy of quantized random variables.

PDF parameter $\sigma$ defines the bit rates used by the codec, which are measured with the entropy function defined in eq. (4). FIG. 10 shows a plot 1000 that illustrates how the entropy of quantized values varies with parameter $\sigma$ in the range of standard deviations that are desired to be supported. More specifically, FIG. 10 shows entropy (in bits) of quantized random variables with Gaussian distribution as a function of the standard deviation $\sigma$.

Figure 11:
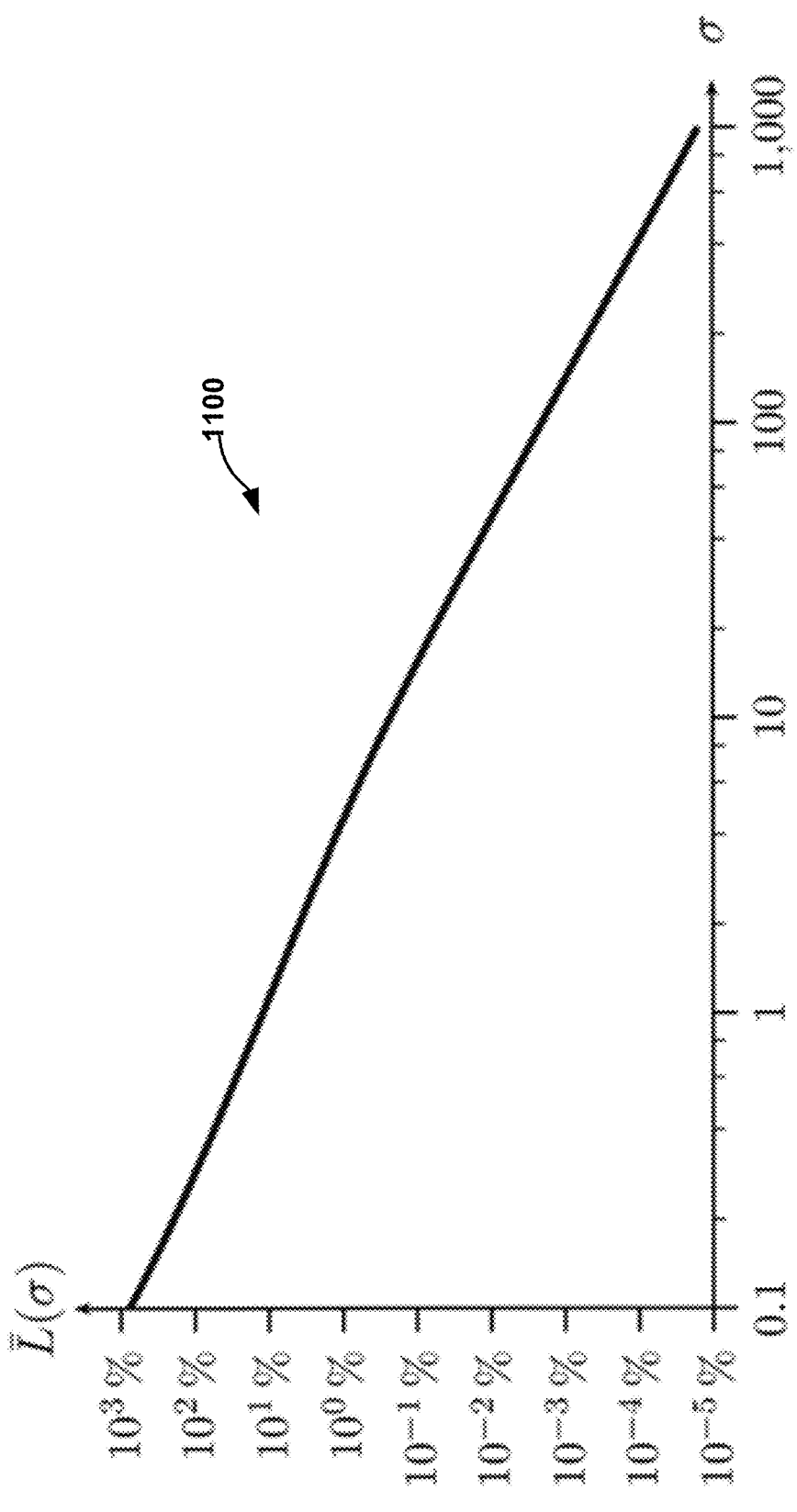
FIG. 11 illustrates an example average relative redundancy from using uniform quantization of Gaussian standard deviation.

If a media coder (e.g., media encoder 200 or media decoder 300) is configured to quantize $\sigma$ in the range [0.1, 1,000] to 256 values (fitting a single byte), and uses eq. (9) to create one code vector for each of the 256 intervals defined by $\hat{\sigma}$, the media coder would obtain the average values of relative redundancy that are shown in FIG. 11. FIG. 11 shows a plot 1100 illustrating the average relative redundancy (loss in compression) incurred by using uniform quantization of Gaussian standard deviation $\sigma$, and C=256 code vectors.

The following problems can be observed for FIGS. 10 and 11:
1. The entropy function has very high derivatives at small values of $\sigma$ (the most used range), complicating the learning convergence during training.
2. Because the entropy is highly non-linear near the origin, it is difficult to be reproduced with quantized neural networks.
3. Important differences for small $\sigma$ values cannot be separated when $\hat{\sigma}$ has low precision, resulting in the very high relative redundancy shown near the origin in FIG. 11.

4. The range of $\sigma$ corresponds to values that are needed in practice, but as shown in FIG. 9, most of that range is typically rarely used. In the example shown, the range of small values of values of $\sigma$ is most used, and it is also where the quantization problems are worst.

In short, using of the standard deviation as the value for defining entropy coding can work reasonably well with high-precision floating-point implementations, but may not be beneficial for the quantized neural networks used in practical implementations.

Similar problems occur for other types of probability distributions whenever codec designers choose a PDF parameter because it has a familiar and intuitive meaning. High precision neural networks can "learn" how to optimally use those parameters via extensive training, but quantized networks may not. Using non-uniform quantization (e.g., as shown in the example of FIG. 8) may not directly solve those problems, since in the practical implementation, the assignment of code vectors is made using quantized parameter $\hat{\sigma}$.

The practical problems presented above are caused by how PDF parameter $\sigma$ shapes the entropy function, and by its conversion to a low-precision integer representation (indicated in FIG. 6 by the block with quantization $Q_\sigma$). It may be difficult to identify the origins of those problems from a direct analysis of how eq. (4) defines the entropy of quantized values, since it is an infinite sum of terms without a clear intuitive interpretation. More insight may be obtained by considering simpler approximations. For Gaussian distributions and large values of $\sigma$ the entropy can be approximated by the following:

$$H(\sigma) \approx \log_2(\sigma + 0.05) + \frac{1 + \ln(2\pi)}{2\ln(2)}, \quad (11)$$

and for small values of values of $\sigma$ by:

$$H(\sigma) \approx \frac{(4\sigma + 0.35)}{\sqrt{2\pi}\,\sigma} \exp\left(-\frac{1}{8\sigma^2}\right). \quad (12)$$

Figure 12:
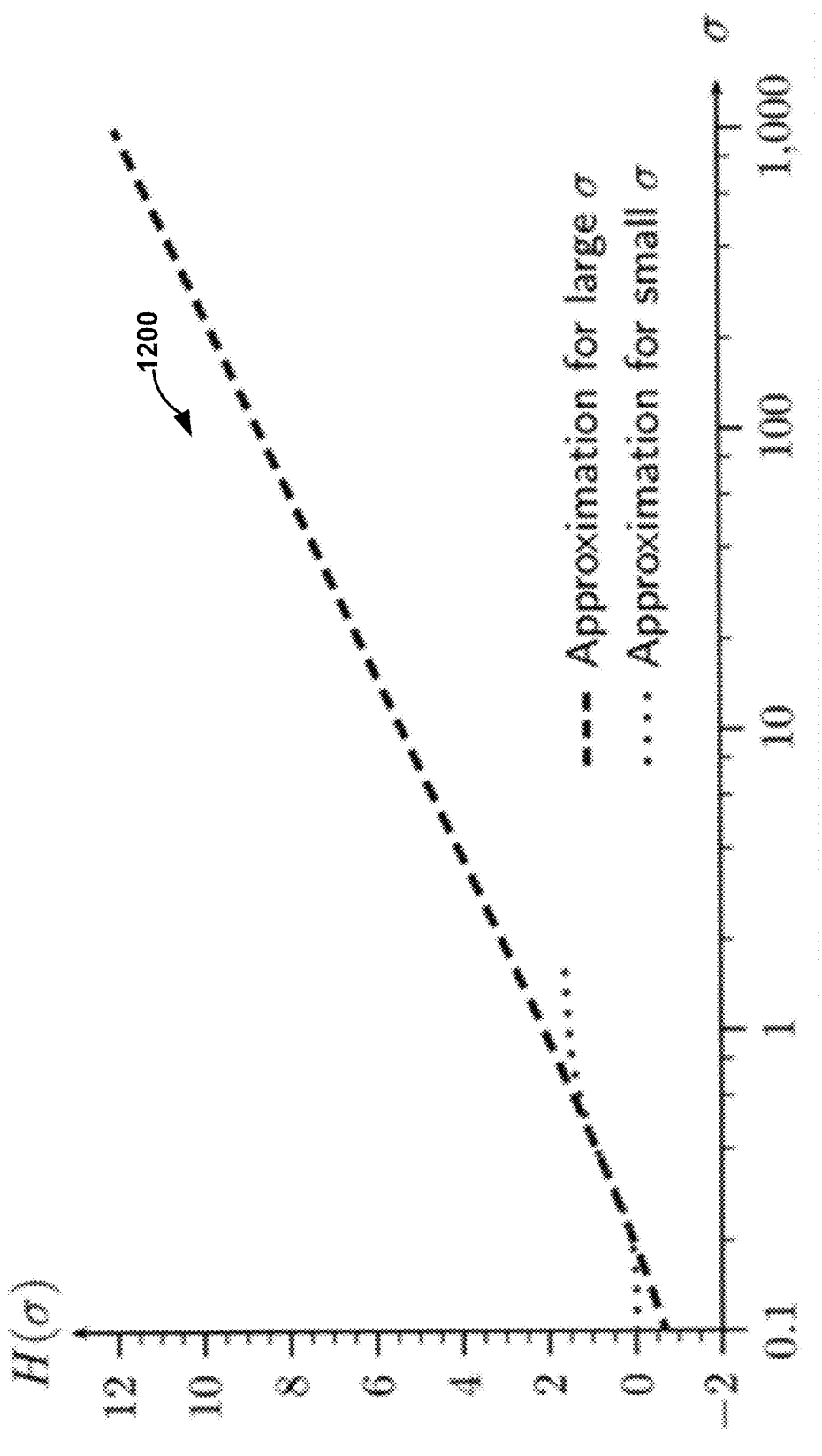
FIG. 12 illustrates an example entropy of quantized random variables on a logarithmic scale.

FIG. 12 shows the entropy graph 1200 of FIG. 10 when a logarithmic scale is used for parameter $\sigma$, together with the approximations defined above. In both quick asymptotic convergence can be observed, as well very good matches within the proper range of $\sigma$, and a middle range where both approximations are nearly the same.

From FIG. 12, it is easier to recognize that the logarithm of $\sigma$ provides a more direct relationship to the entropy, and thus can be a better parameter to define the PDF. One remaining aspect to be considered is that, as shown in FIG. 9, small $\sigma$ values are expected to be the most common, and such small values for $\sigma$ correspond to very small entropies.

Figure 13:
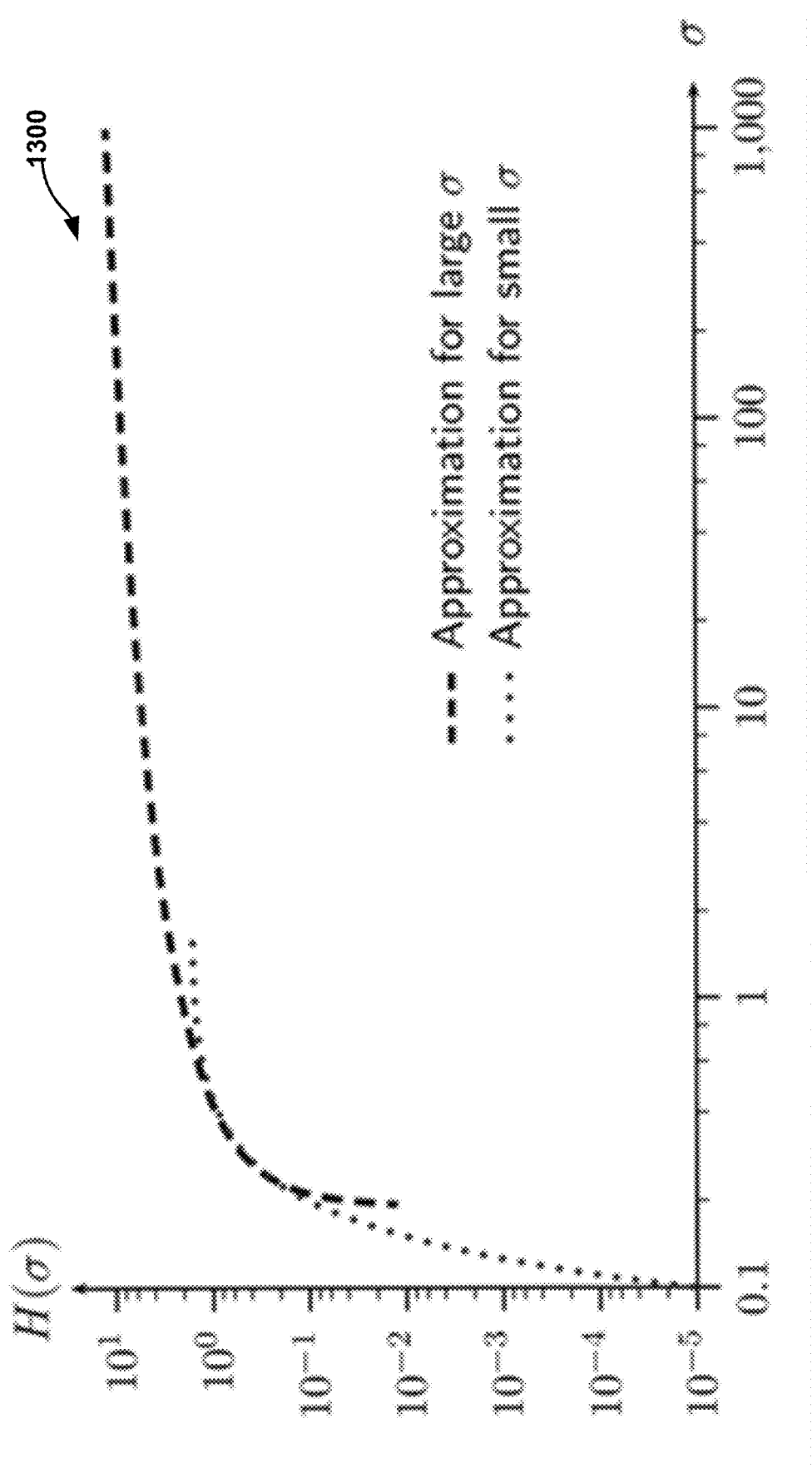
FIG. 13 illustrates another example entropy of quantized random variables on a logarithmic scale.

Using logarithmic scales for both entropy and standard deviation, as shown in FIG. 13, shows that the way the entropy function varies at low values of $\sigma$ may also be beneficial to consider. Since it may be that case that a media encoder 200 or media decoder 300 may encounter a very large number of values with very low entropy, even very small absolute errors can produce large relative redundancies and large compression losses. FIG. 13 shows a plot 1300 that illustrates entropy and its approximations from eqs. (11) and (12), graphed with logarithmic scales.

Even though quantization errors are inevitable, the techniques of this disclosure are based on the fact that it is possible to reduce the compression loss by replacing the variable to be quantized, considering how the quantization errors affect the relative redundancy.

Figure 14:
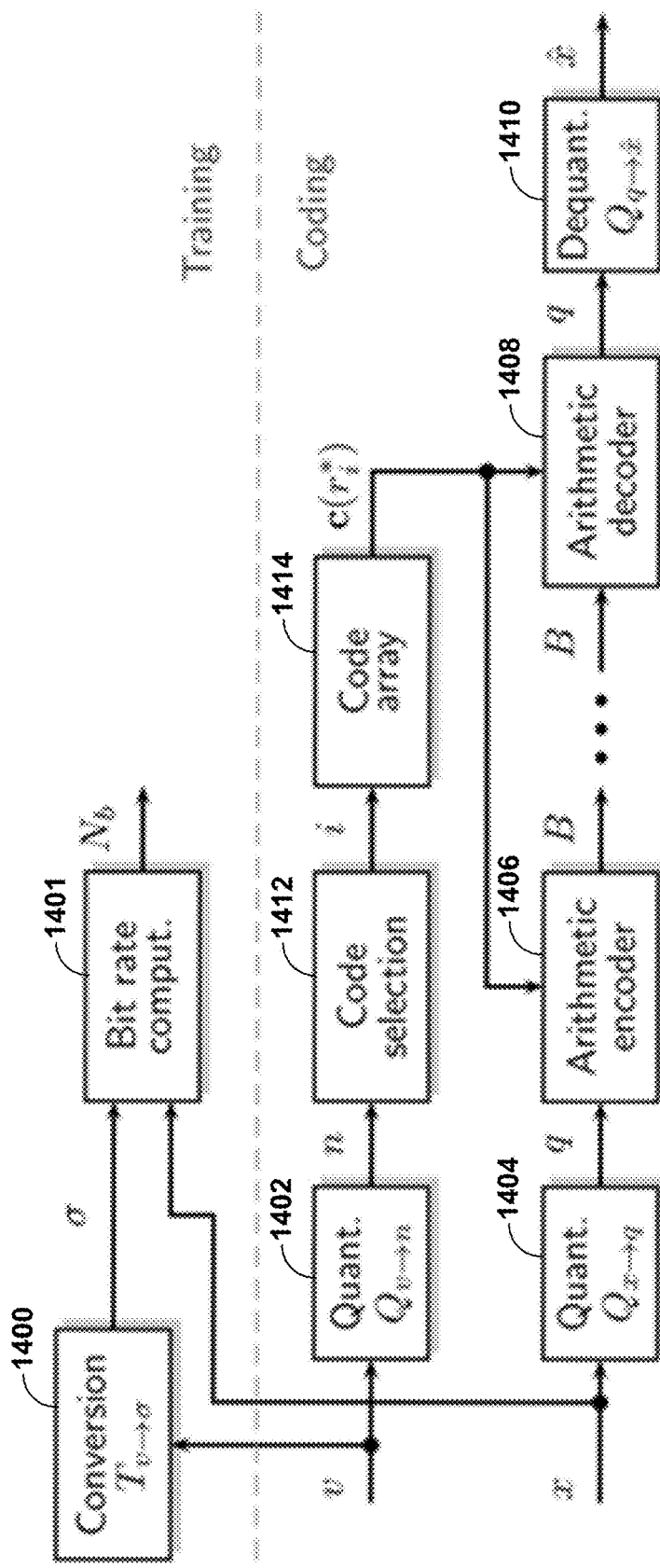
FIG. 14 illustrates a block diagram of another example neural-based codec.

One example technique is shown in FIG. 14, where a new variable called ν is defined for parameterizing the PDF. In general PDF parameter ν may be determined using a non-linear function (e.g., logarithmic) of PDF parameter σ. A conversion function between σ and ν is defined such that:

$$\sigma = T_{\nu \to \sigma}(\nu). \quad (13)$$

FIG. 14 shows a modification of the practical codec of FIG. 6 to enable new design variables optimized for entropy coding, and tables for more efficient assignment of code vectors. As indicated in FIG. 14, this function allows the codec designers to continue using PDF parameter σ in training, and it is assumed that this function is differentiable almost everywhere, to preserve automatic gradient back propagation.

To simplify the presentation, the following conventions are adopted:

$$\sigma \in [\sigma_{min}, \sigma_{max}) \subset \mathbb{R},$$

$$\nu \in [0,1) \subset \mathbb{R},$$

$$T_{\nu \to \sigma}(0) = \sigma_{min},$$

$$T_{\nu \to \sigma}(1) = \sigma_{max},$$

$$Q_{\nu \to n}(\nu) = \lfloor N\nu \rfloor \in \{0, 1, \ldots, N-1\},$$

$$\nu_0 < \nu_1 \Rightarrow T_{\nu \to \sigma}(\nu_0) < T_{\nu \to \sigma}(\nu_1). \quad (14)$$

Equation (14) specifies that σ ranges from a minimum value ($\sigma_{min}$) to a maximum value ($\sigma_{max}$). New parameter ν ranges from 0 to 1. The conversion function $T_{\nu \to \sigma}$ at ν value of 0 is equal to $\sigma_{min}$. The conversion function $T_{\nu \to \sigma}$ at ν value of 1 is equal to $\sigma_{max}$. The quantization of new parameter ν (e.g., $Q_{\nu \to n}(\nu)$) produces integers ranging from 0 to N−1. Further it is defined that if $\nu_0 < \nu_1$ then $T_{\nu \to \sigma}(\nu_0) < T_{\nu \to \sigma}(\nu_1)$.

In FIG. 14, data is not encoded during training phase. Because the coding phase is configured to use new PDF parameter ν, the training phase includes conversion ($T_{\nu \to \sigma}$) process 1400 to convert PDF parameter ν back to PDF parameter σ (e.g., the standard deviation of the PDF). Bit rate computation process 1401 uses data element x and PDF parameter σ to estimate the number of bits $N_b$ used by the arithmetic coding process.

In the example of FIG. 14, quantization process ($Q_{\nu \to n}$) 1402 quantizes the PDF parameter ν to create quantized PDF parameter n. Code selection process 1412 then converts the quantized PDF parameter n to a code vector index i. Code vector index i may be an input to code array process 1414. That is code vector index i may be an index to a lookup table of code vectors. Code array process 1414 then determines code vector $c(r^*_i)$ from code vector index i. Code vector $c(r^*_i)$ is used to arithmetically code data element x.

Quantization process ($Q_{x \to q}$) 1404 quantizes data element x to create quantized data element q. Arithmetic encoder 1406 then uses code vector $c(r^*_i)$ to arithmetically code quantized data element q to create bitstream B. Arithmetic decoder 1408 recovers quantized data element q by performing arithmetic decoding using the same code vector $c(r^*_i)$. Dequantization process ($Q_{q \to \hat{x}}$) 1410 performs dequantization of quantized data element q to recover decoded data element $\hat{x}$. Decoded data element $\hat{x}$ may then be decoded by a neural-based decoding technique to reconstruct the original media (e.g., a picture or video).

In general, in one example of the disclosure, media encoder 200 and media decoder 300 may be configured to determine a probability distribution function parameter (e.g., ν) for a data element (x) of a data stream coded by a neural-based media compression technique. The probability distribution function parameter (ν) may be determined from a logarithmic function (e.g., natural logarithm (ln)) of a standard deviation (σ) of a probability distribution function of the data stream. Media encoder 200 and media decoder 300 may be further configured to determine a code vector ($c(r^*_i)$) based on the probability distribution function parameter (ν), and may arithmetically code the data element (x) using the code vector ($c(r^*_i)$).

As shown in FIG. 14, in one example, media encoder 200 and media decoder 300 may be configured to quantize the probability distribution function parameter ν prior to determining the code vector. In one example, to determine the code vector media encoder 200 and media decoder 300 may be configured to determine a code vector index (i) based on the probability distribution function parameter ν, and determine the code vector from a table of code vectors based on the code vector index. More information on tables of code vectors will be described below.

From the encoder side, media encoder 200 may be configured to generate the data element x using the neural-based compression technique, and may quantize the data element to create a quantized data element. In this example, arithmetically coding the data element using the code vector comprises arithmetically encoding the quantized data element using the code vector. Further in this example, e.g., as shown in FIG. 4, media encoder 200 may be configured to process an image or video picture using an image analysis neural network to generate the data element.

From the decoder side, media decoder 300 may decode an encoded data element using the code vector to create a quantized data element. Media decoder 300 may further dequantize the quantized data element to create a reconstructed data element. Media decoder 300 may then process the reconstructed data element using an image synthesis neural network to reconstruct an image or video picture.

The next aspect to be considered is that the performance of entropy coding is measured by the relative redundancy measures defined in eqs. (7) and (10). Below, examples of the practical application of this approach are presented.

Logarithmic Conversion

Most commonly, neural-based codecs are configured to operate using the assumption $x \sim \mathcal{N}(0, \sigma)$, i.e., the variables to be coded have zero-mean Gaussian (or normal) distribution. While some example hyperprior network use some learned PDFs, more recent work show that there is improvement when the learned PDFs are replaced with Gaussian PDFs and learned parameters.

Using this fact, and the observation in FIG. 12 and FIG. 13 that the logarithm of the standard deviation provides a more precise parameterization of the PDF, a variable conversion function may be defined using:

$$\sigma = T_{\nu \to \sigma} = exp(\nu \ln(\sigma_{max}) + (1-\nu)\ln(\sigma_{min})), \quad (15)$$

and its inverse as:

$$\nu = T_{\sigma \to \nu}(\sigma) = \frac{\ln(\sigma) - \ln(\sigma_{min})}{\ln(\sigma_{max}) - \ln(\sigma_{min})}. \quad (16)$$

Figure 15:
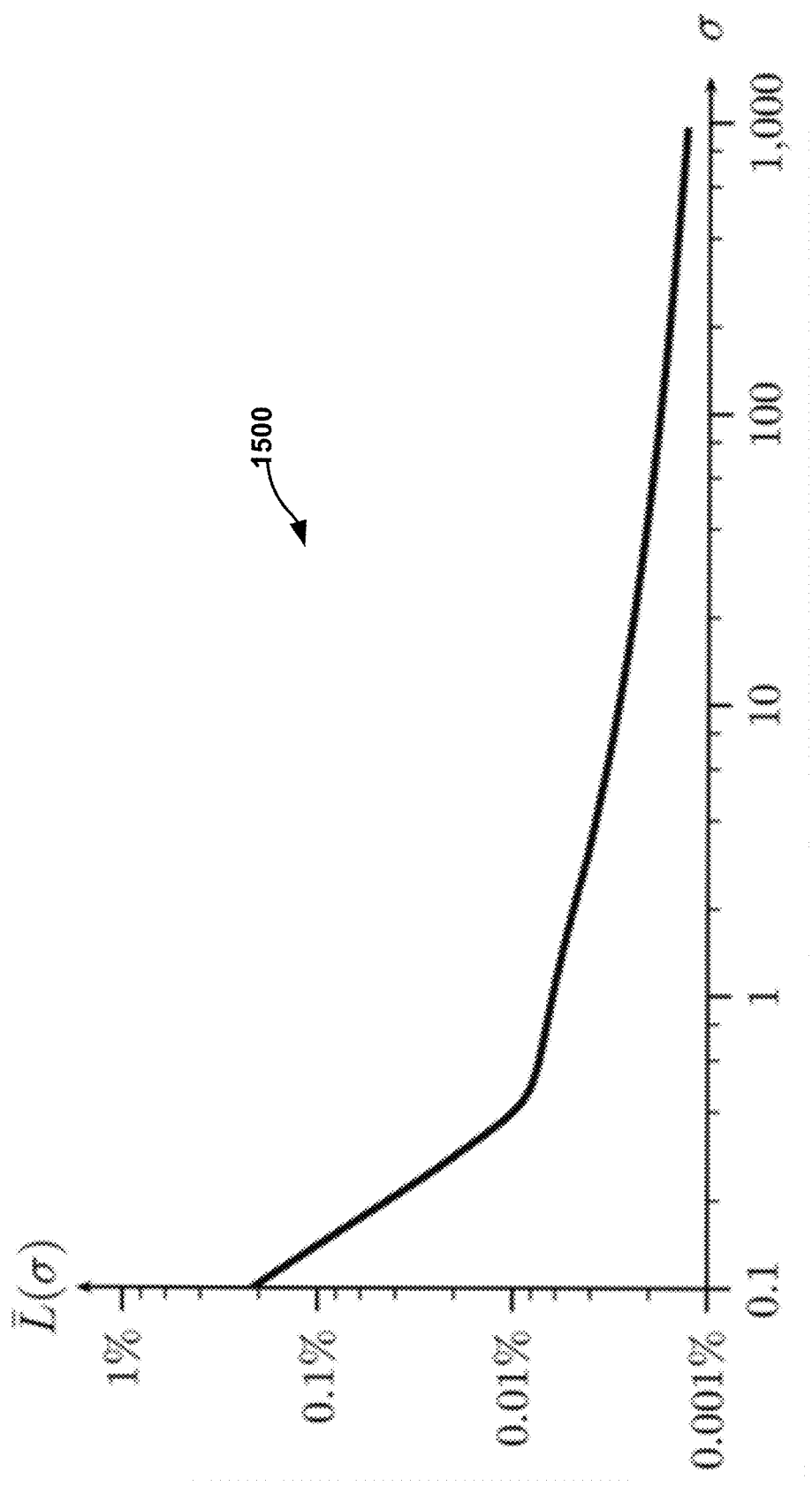
FIG. 15 illustrates an example of average relative redundancy using uniform quantization of a probability distribution function parameter.

The function ln( ) is a natural logarithm. When this new parameter ν is quantized using N=256, and the corresponding C=256 code vectors are optimized according to eq. (9), the average relative redundancies shown in FIG. 15 are obtained. FIG. 15 shows plot 1500 which illustrates the average relative redundancy (loss in compression) incurred by using uniform quantization of PDF parameter ν with N=256, and C=256 code vectors. FIG. 15 shows that PDF parameter ν is a more suitable parameter for defining Gaussian PDFs since the relative redundancy is always below 1%.

The conversion equations (15) and (16) shown above only use the exponential and logarithm functions, which are continuous and with derivatives that are easy to compute during design and training.

Tables for Selecting Code Vectors

One additional aspect to be considered is that since code vectors are constantly accessed during entropy coding, to maintain high data throughputs it may be preferable to store code vectors in more expensive fast memory. Thus, reducing the number of code vectors enables savings in memory requirements and costs.

A savings in memory requirements and costs can be achieved using the code selection tables 1600, which are shown in FIG. 16, after quantization of PDF parameter ν. Those are simple tables with N elements, to enable non-uniform assignment of code vectors, similarly to the example of FIG. 8, but instead of using floating-point values defining transitions based on PDF parameter σ, the tables are applied directly to integer values n, obtained after quantization of PDF parameter ν.

Figure 17:
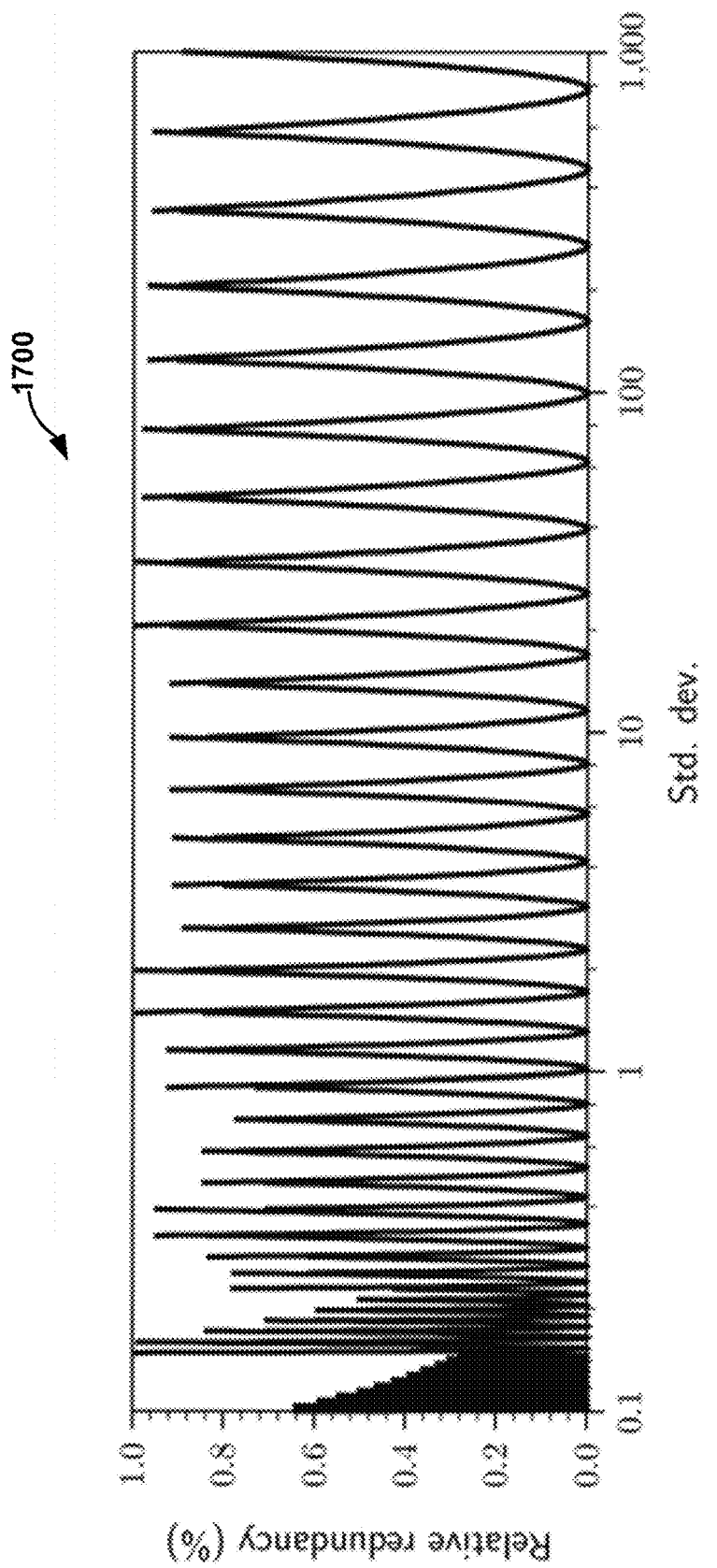
FIG. 17 illustrates an example of relative redundancy using a uniform quantization of a probability distribution function parameter.

The advantage is that this process is an integer-to-integer conversion that can be done very efficiently with a simple table-look-up implementation. FIG. 16 shows an example of such a table 1600 defining the number of code vectors that should be used for entropy coding, for each of the 256 possible values of n. The total table memory is 256 bytes in the example of FIG. 16. Media encoder 200 and media decoder 300 may use table 1600 in FIG. 16 that is used to convert PDF parameter ν, quantized by value n with N=256, to code vector index i. Table 16 was designed to better ensure maximum redundancy smaller than 1%, as shown in FIG. 17, thus enabling the reduction of the number of code vectors from 256 to 43. FIG. 17 shows a plot 1700 illustrating the resulting relative redundancy according to standard deviation.

Another way to limit memory usage is to reduce the range of standard deviation values. For example, a neural-based may be implemented using the following PDF parameters:

$$\sigma_{min}=0.112, \sigma_{max}=334.5 \Rightarrow \ln(\sigma_{max}/\sigma_{min})=8, \quad (17)$$

which corresponds to following conversion equation:

$$n=\max[0,\min[255,\lfloor 32 \ln(\sigma)\rfloor+70]], \quad (18)$$

where multiplication by 32 can be implemented via bit shifts.

FIG. 18 shows a code vector selection table 1800 designed for the above transformation, reducing the number of code vectors to 25.

The modified entropy coding scheme of FIG. 14, and the PDF parameter transformation of eq. (16) are effective in reducing the degradation caused by quantization of PDF parameters. In fact, the techniques described above enable moving from the unacceptable redundancy values shown in FIG. 11 to the useful redundancy values shown in FIG. 15.

However, it can also be observed that the redundancy values in FIG. 15 are larger for small values of σ (the most common and important values of σ), and may be unnecessarily small for the less important large values of σ.

Figure 19:
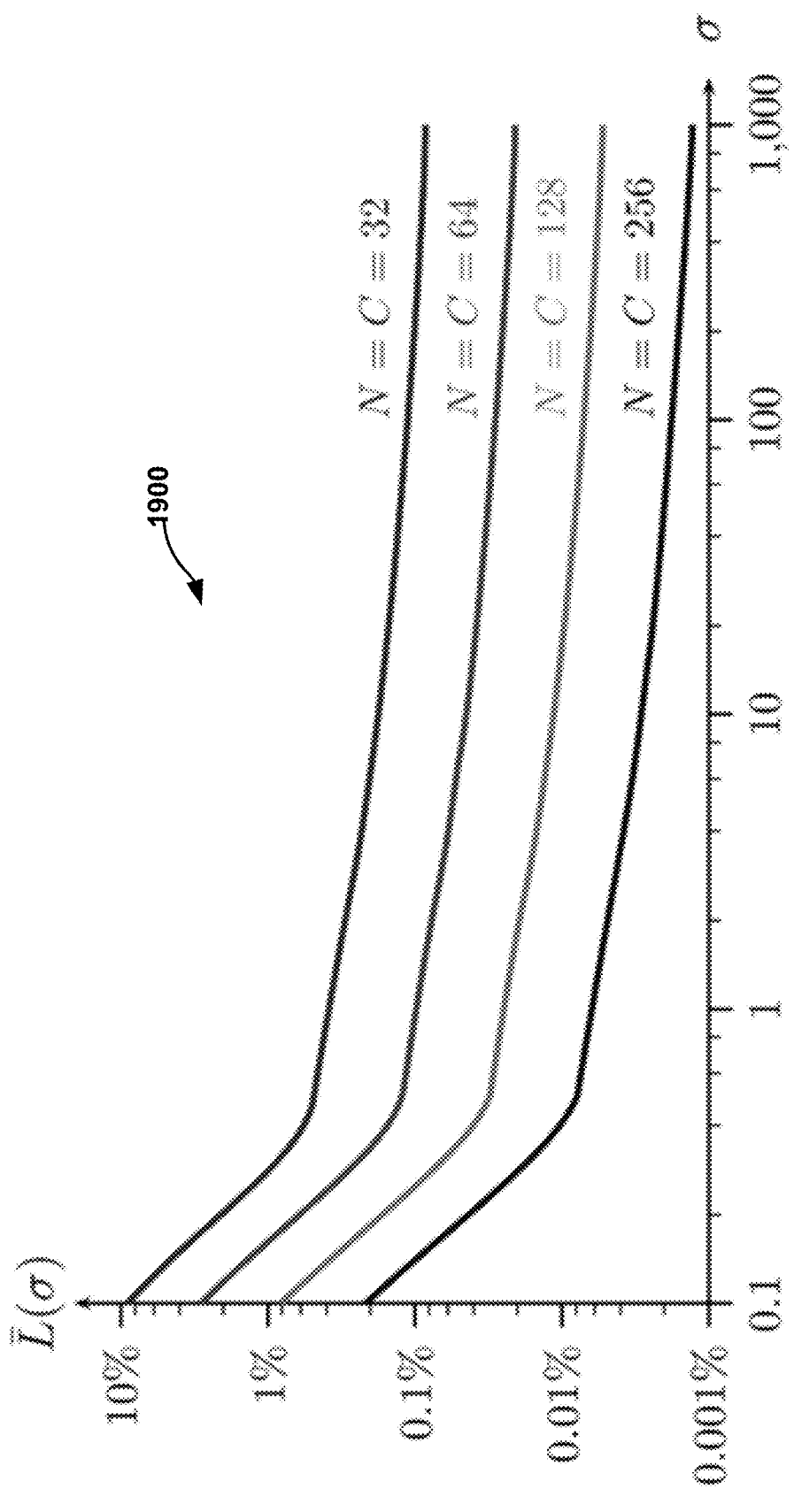
FIG. 19 illustrates an example relative redundancy according to one example of the disclosure.

If it is desirable to use the number of code vectors C equal to the number of quantization intervals N, then the redundancy curves 1900 shown in FIG. 19 are obtained. FIG. 19 shows relative redundancy incurred by quantization of PDF parameter ν as defined by eq. (16), dividing interval [0, 1] into N same size intervals (uniform quantization), and using C=N code vectors. The redundancy curves 1900 in FIG. 19 happen to be nearly parallel (as will be explained in more detail below), which also means that small values of σ have worst-case relative redundancy, and quickly become high when C=N decreases.

The code vector selection method described above may alleviate this problem, but may have the following limitations:

1) Because relative redundancies for small values of σ correspond to the worst cases, the number of quantization intervals N is relatively large.

2) Memory reduction can be achieved by having the number of code vectors C smaller than N, which may be addressed using the addition of a table-look-up stage, as described above.

3) The optimal tables and code vectors depend on both N and C, and may be re-computed when those parameters change.

The problems with variable conversion defined by eq. (16) are caused by the fact that the choice of parameters were motivated by, and provide for, simplicity and convenience. This disclosure shows that, using the theory presented above, conversion functions may be defined that provide even better control of the relative redundancy.

This disclosure defines another PDF parameter u to represent a new parameter defining the entropy coding PDF. In general, the PDF parameter u is a parameterization of a distribution (e.g., distribution of code vectors) that has been optimized for quantization. Or more generally, the parameter u is optimized to provide the lower relative redundancy (e.g., loss) compared to other parameters. To simplify the notation, this disclosure defines the parameter conversion process using the two functions below:

$$\sigma = T_{u \to \sigma}(u) = T_{\lambda \to \sigma}(T_{u \to \lambda}(u)), \quad (19)$$

where $$T_{\lambda \to \sigma}(\lambda) = \exp(\lambda \ln(\sigma_{max}/\sigma_{min}) + \ln(\sigma_{min})), \quad (20)$$

which is similar to conversion (15) described above.

Equations (19) and (20) are assumed to satisfy the following conventions:

$$\sigma \in [\sigma_{min}, \sigma_{max}] \subset \mathbb{R},$$

$$u, \lambda \in [0,1) \subset \mathbb{R},$$

$$T_{\lambda \to \sigma}(0) = \sigma_{min},$$

$$T_{\lambda \to \sigma}(1) = \sigma_{max},$$

$$T_{u \to \lambda}(0) = 0,$$

$$T_{u \to \lambda}(1) = 1,$$

$$Q_{u \to n}(u) = \lfloor Nu \rfloor \in \{0, 1, \ldots, N-1\}. \quad (21)$$

Equation (21) specifies that σ ranges from a minimum value ($\sigma_{min}$) to a maximum value ($\sigma_{max}$). New parameter u ranges from 0 to 1. The conversion function $T_{\lambda \to \sigma}$ at λ value of 0 is equal to $\sigma_{min}$. The conversion function $T_{\lambda \to \sigma}$ at λ value of 1 is equal to $\sigma_{max}$. The conversion function $T_{u \to \lambda}$ at u value of 0 is equal to 0. The conversion function $T_{u \to \lambda}$ at u value of 1 is equal to 1. The quantization of new parameter u (e.g., $Q_{u \to n}(u)$) produces integers ranging from 0 to N−1.

The example in FIG. 8 shows that it is possible to design non-uniform partitions of an interval [$\sigma_a$, $\sigma_b$] and, with the code vector optimization of eq. (9), obtain the same maximum relative redundancy in all sub-intervals. As above, this approach may not be practical when parameter σ is quantized, but the techniques of this disclosure exploit the fact that the non-uniform partitions can be employed when the parameter u is quantized.

Figure 20:
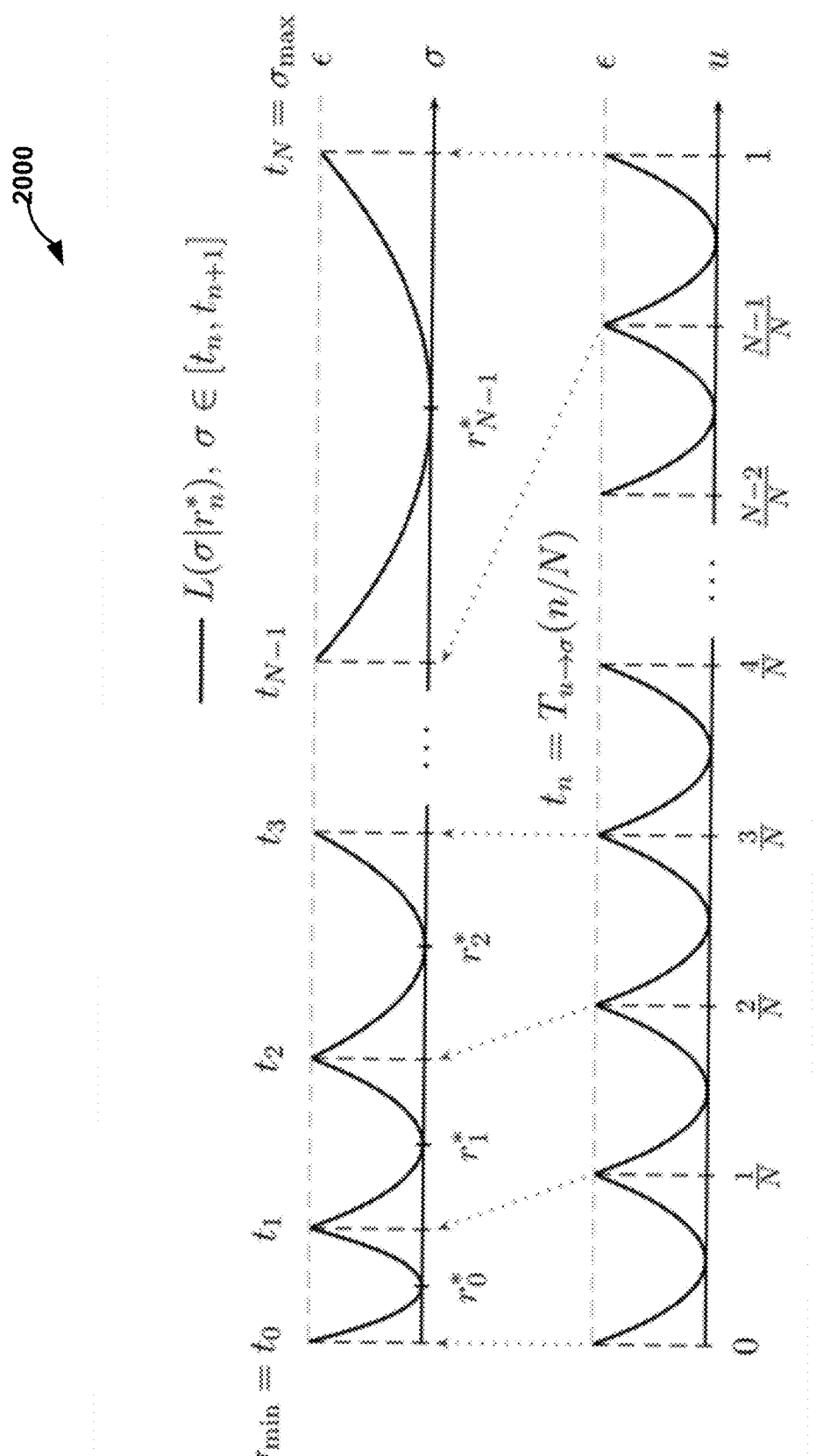
FIG. 20 illustrates an example of probability distribution function parameter partitioning.

FIG. 20 shows a graphical representation 2000 of the process of partitioning PDF parameter interval [$\sigma_{min}$, $\sigma_{max}$] to obtain the same maximum relative redundancy in N intervals. This can be done using the following algorithm.

---
ALGORITHM I
---
1. Given N and [$\sigma_{min}$, $\sigma_{max}$], choose initial maximum redundancy ε; initialize $t_0 = \sigma_{min}$
2. For n = 1,2, ... , N:
   a. Find $r^*_{n-1}$ such that $L(t_{n-1}|r^*_{n-1}) = \epsilon$
   b. Find $t_n$ such that $L(t_n|r^*_{n-1}) = \epsilon$
3. If $t_N \approx \sigma_{max}$ then stop.
4. If $t_N < \sigma_{max}$ then increase ε, otherwise decrease ε, using a method for unidimensional search (like bisection).
5. Go to step 2.

---

As indicated in the lower part of FIG. 20, the sequence $\{t_n\}_{n=0}^N$ can provide N values for functions $T_{u \to \sigma}(u)$, and intermediary values can be computed via interpolation. Since the N quantization intervals are chosen to have the same maximum relative redundancy, media encoder 200 and media decoder 300 can be configured to use the same number of code vectors, i.e., C=N, eliminating the need for code selection tables, and enabling the simplified codec implementation shown in FIG. 21.

Figure 21:
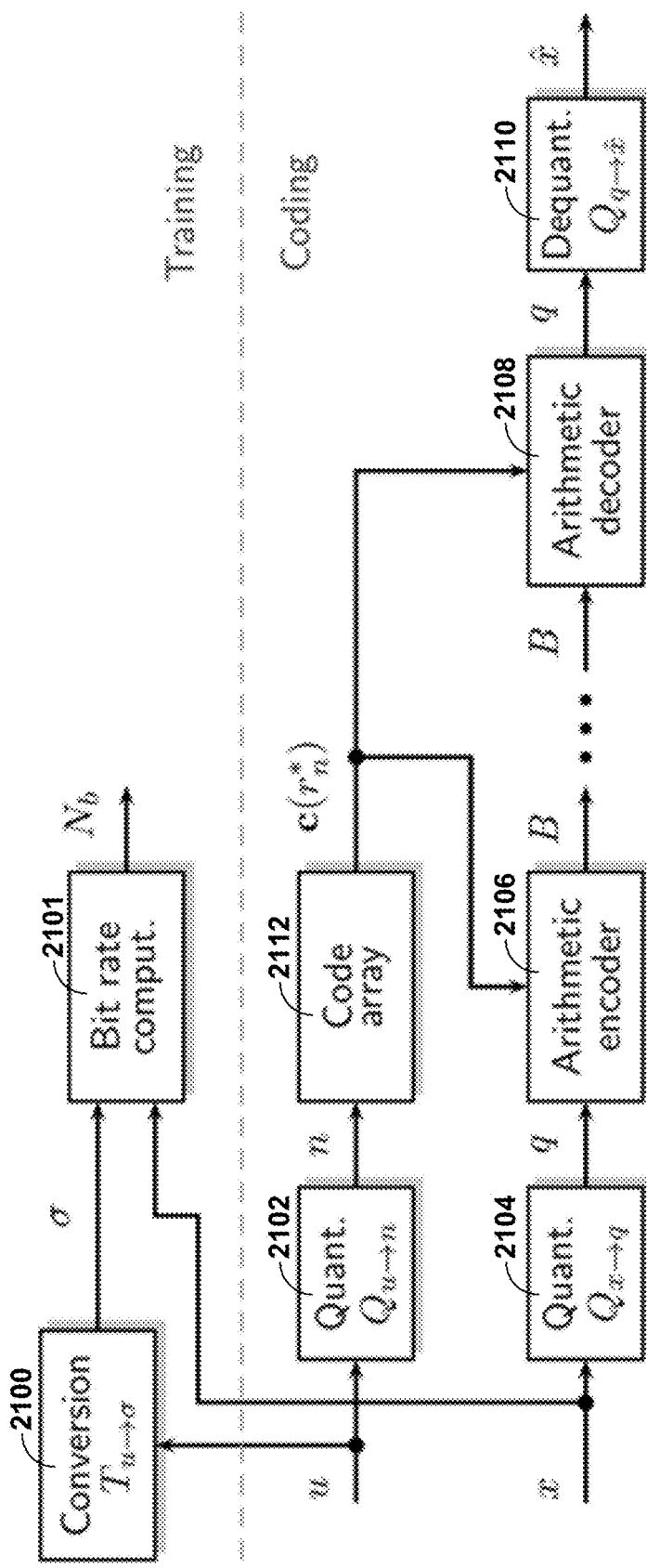
FIG. 21 illustrates a block diagram of another example neural-based codec

In FIG. 21, data is not encoded during training phase. Because the coding phase is configured to use new PDF parameter u, the training phase includes conversion ($T_{u \to \sigma}$) process 2100 to convert PDF parameter u back to PDF parameter σ (e.g., the standard deviation of the PDF). Bit rate computation process 2101 uses data element x and PDF parameter σ to estimate the number of bits $N_b$ used by the arithmetic coding process.

In the example of FIG. 21, quantization process ($Q_{u \to n}$) 2102 quantizes the PDF parameter u to create quantized PDF parameter n. Code array process 2112 then converts the quantized PDF parameter n to a code array $c(r^*_n)$ (also called code vector $c(r^*_n)$). Unlike the technique of FIG. 14, the technique of FIG. 21 does not use a lookup table to determine the code vector. Code vector $c(r^*_n)$ is used to arithmetically code data element x.

Quantization process ($Q_{x \to q}$) 2104 quantizes data element x to create quantized data element q. Arithmetic encoder 2106 then uses code vector $c(r^*_n)$ to arithmetically code quantized data element q to create bitstream B. Arithmetic decoder 2108 recovers quantized data element q by performing arithmetic decoding using the same code vector $c(r^*_i)$. Dequantization process ($Q_{q \to \hat{x}}$) 2110 performs dequantization of quantized data element q to recover decoded data element $\hat{x}$. Decoded data element $\hat{x}$ may then be decoded by a neural-based decoding technique to reconstruct the original media (e.g., a picture or video).

In general, in one example of the disclosure, media encoder 200 and media decoder 300 may be configured to determine a probability distribution function parameter (e.g., u) for a data element (x) of a data stream coded by a neural-based media compression technique. The probability distribution function parameter (u) may be based on a distribution that is optimized for quantization. The distribution function parameter (u) may be determined according to an algorithm that measures coding redundancy or defined by solving an ordinary differential equation. Media encoder 200 and media decoder 300 may be further configured to determine a code vector $(c(r^*_n))$ based on the probability distribution function parameter (u), and may arithmetically code the data element (x) using the code vector $(c(r^*_n))$.

As shown in FIG. 21, in one example, media encoder 200 and media decoder 300 may be configured to quantize the probability distribution function parameter u prior to determining the code vector. In one example, to determine the code vector media encoder 200 and media decoder 300 may be configured to determine code vectors $(c(r^*_n))$ based on the quantized probability distribution function parameter u (n).

From the encoder side, media encoder 200 may be configured to generate the data element x using the neural-based compression technique, and may quantize the data element to create a quantized data element. In this example, arithmetically coding the data element using the code vector comprises arithmetically encoding the quantized data element using the code vector. Further in this example, e.g., as shown in FIG. 4, media encoder 200 may be configured to process an image or video picture using an image analysis neural network to generate the data element.

From the decoder side, media decoder 300 may decode an encoded data element using the code vector to create a quantized data element. Media decoder 300 may further dequantize the quantized data element to create a reconstructed data element. Media decoder 300 may then process the reconstructed data element using an image synthesis neural network to reconstruct an image or video picture.

One possible caveat of the techniques described above is that conversion function $T_{u \to \sigma}(u)$ theoretically depends on the number of quantization intervals N, and significantly differences would mean that hyper-prior neural networks would need to be trained specifically for that value.

Figure 22:
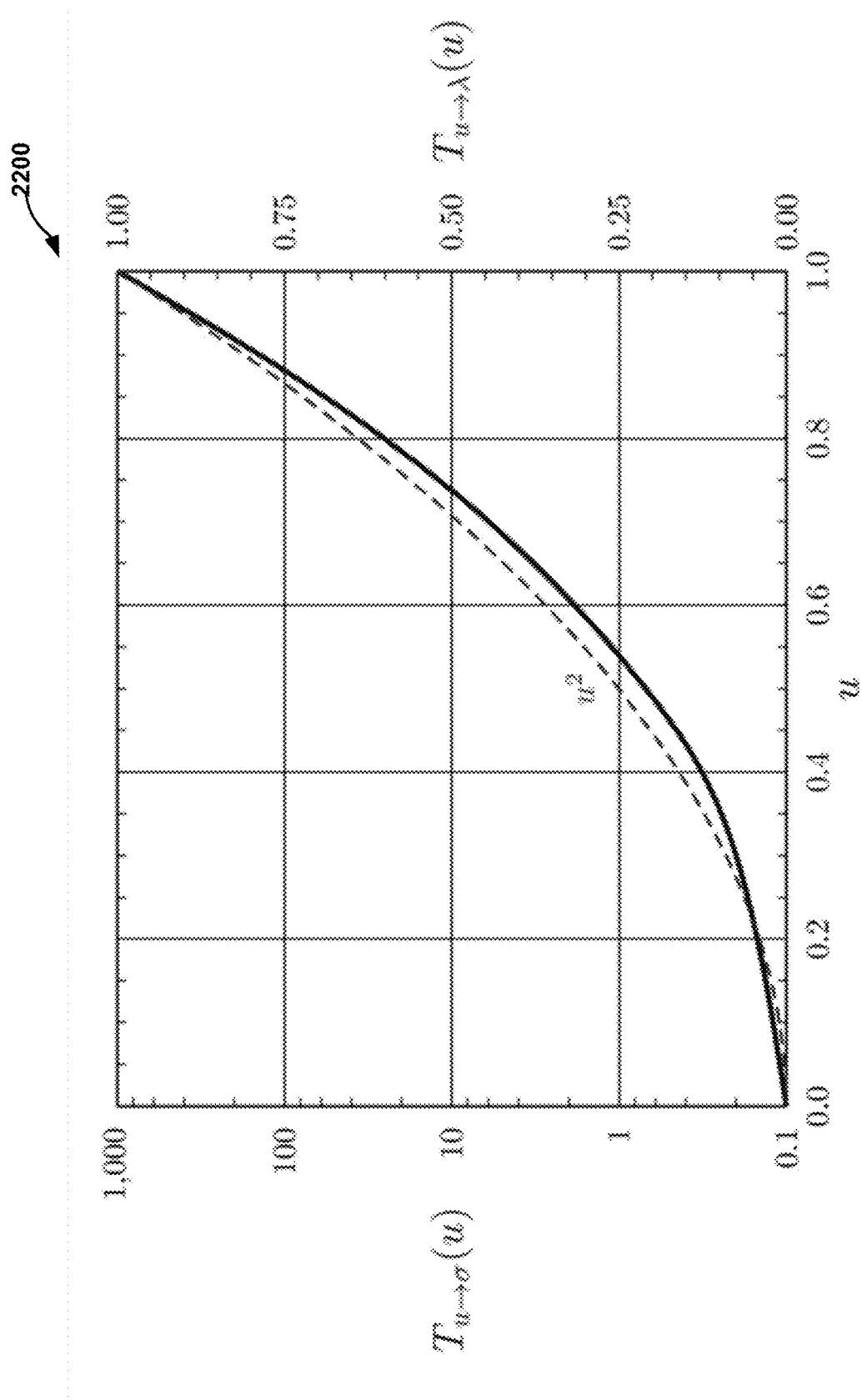
FIG. 22 illustrates example conversion functions for probability distribution function parameters.
Figure 23:
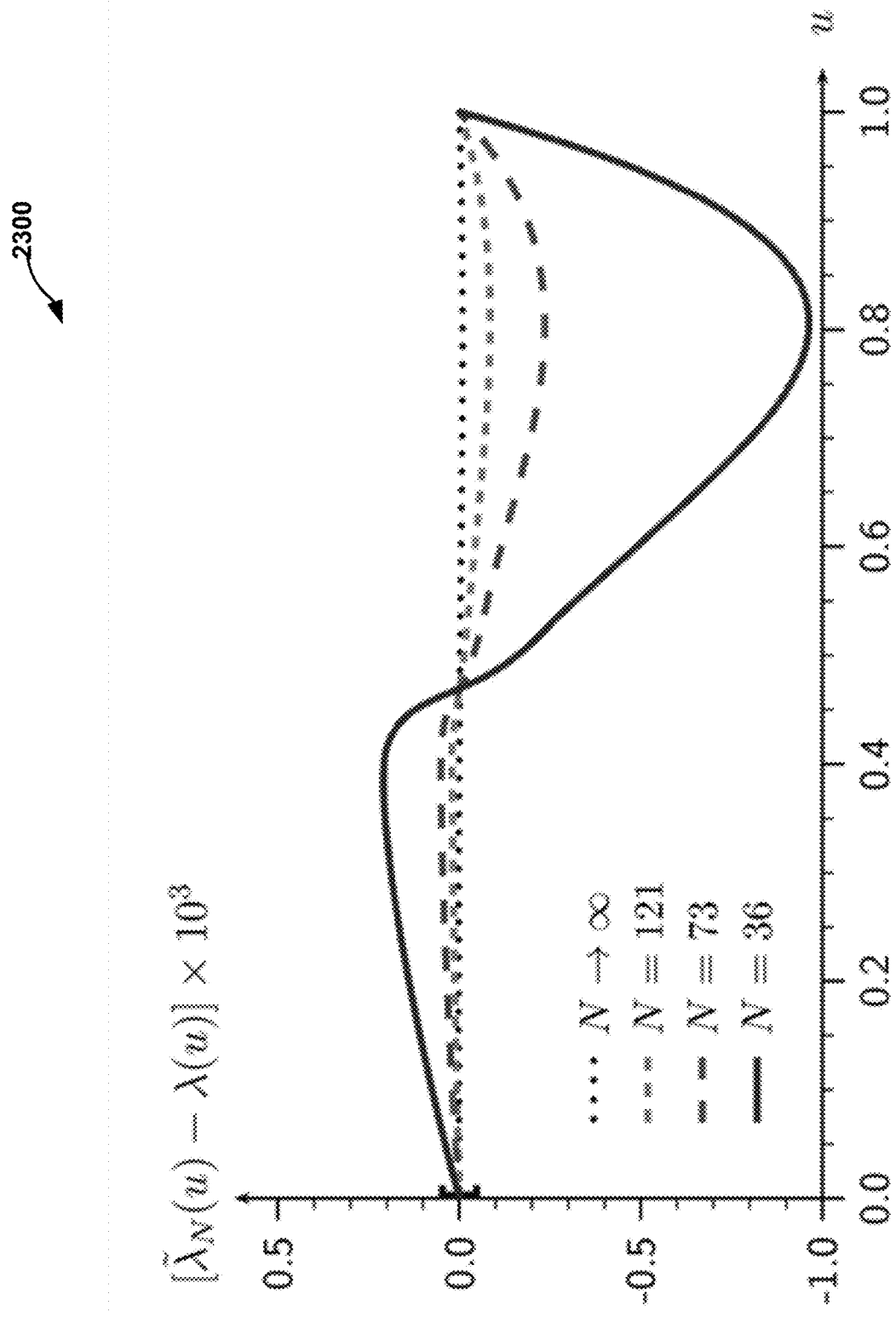
FIG. 23 illustrates example outputs for a conversion function of the disclosure.

However, the functions $T_{u \to \sigma}(u)$ computed for different values of N produced the same graph 2200, which is shown in FIG. 22. In fact, as shown in FIG. 23, the differences between functions $\tilde{\lambda}_N(u)$ computed for several values of N, compared to the function for very large N are remarkably small. FIG. 22 illustrates conversion functions $T_{u \to \sigma}(u)$ and $T_{u \to \lambda}(u)$ that produce constant maximum relative redundancy. The graph 2300 in FIG. 23 illustrates a difference in values of function $T_{u \to \lambda}(u)$ in FIG. 22, computed using Algorithm I above and different values of algorithm parameter N.

This means that a single conversion function $T_{u \to \sigma}(u)$ can be used for all practical values of N, which in turn means that the value of N does not need to be defined when training the hyper-prior neural networks.

It can be shown that the asymptotic values of function $T_{u \to \sigma}(u)$ for N→∞ can be computed considering that, in the limit, the curvature of relative redundancy as defined by parameter u should be a constant value, i.e.:

$$\frac{\partial^2 L(\sigma(u)|r)}{\partial u^2}\bigg|_{r=\sigma(u)} = k \qquad (22)$$

where k is a constant. This can be intuitively seen in the lower part of FIG. 22, where in the limit all redundancy curves are meant to have the same shape.

It can be shown that, for any infinite sequence of probabilities $\{p_n(\sigma)\}_{n=-\infty}^{\infty}$ defined by parameter $\sigma$, we have:

$$\psi(\sigma) = \frac{\partial^2 L(\sigma \mid r)}{\partial \sigma^2}\bigg|_{r=\sigma} = \frac{1}{\ln(2)H(\sigma)} \sum_{n=-\infty}^{\infty} \frac{1}{p_n(\sigma)}\left[\frac{dp_n(\sigma)}{d\sigma}\right]^2. \quad (23)$$

For example, with the distribution of quantized normal variables corresponding to eq. (2), if we define:

$$\omega_n(\sigma) = \mathrm{erfc}\left(\frac{n}{\sqrt{8}\,\sigma}\right), \quad (24)$$

$$\phi_n(\sigma) = \frac{d\omega_n(\sigma)}{d\sigma} = \frac{ne^{-(\frac{n}{\sigma})^2/8}}{\sqrt{2\pi}\,\sigma^2},$$

it can be shown that eq. (23) corresponds to:

$$\psi(\sigma) = \frac{1}{\ln(2)H(\sigma)}\left\{\frac{[\phi_1(\sigma)]^2}{1-\omega_1(\sigma)} + \sum_{n=1}^{\infty}\frac{[\phi_{2n-1}(\sigma)-\phi_{2n+1}(\sigma)]^2}{\omega_{2n-1}(\sigma)-\omega_{2n+1}(\sigma)}\right\}, \quad (25)$$

and eq. (21) corresponds to the ordinary differential equation (ODE):

$$\frac{d\sigma(u)}{du} = \sqrt{\frac{k}{\psi(\sigma)}}, \quad (26)$$

or equivalently, $$\frac{d\lambda(u)}{du} = \frac{1}{\sigma(\lambda)\ln(\sigma_{max}/\sigma_{min})}\sqrt{\frac{k}{\psi(\sigma(\lambda))}}. \quad (27)$$

Those differential equations can be solved with simple methods, like Runge-Kutta, producing a discrete set of points, which can be used together with an interpolation method like cubic splines, for a precise computation of the transformation function $T_{u\to\sigma}(u)$.

Figure 24:
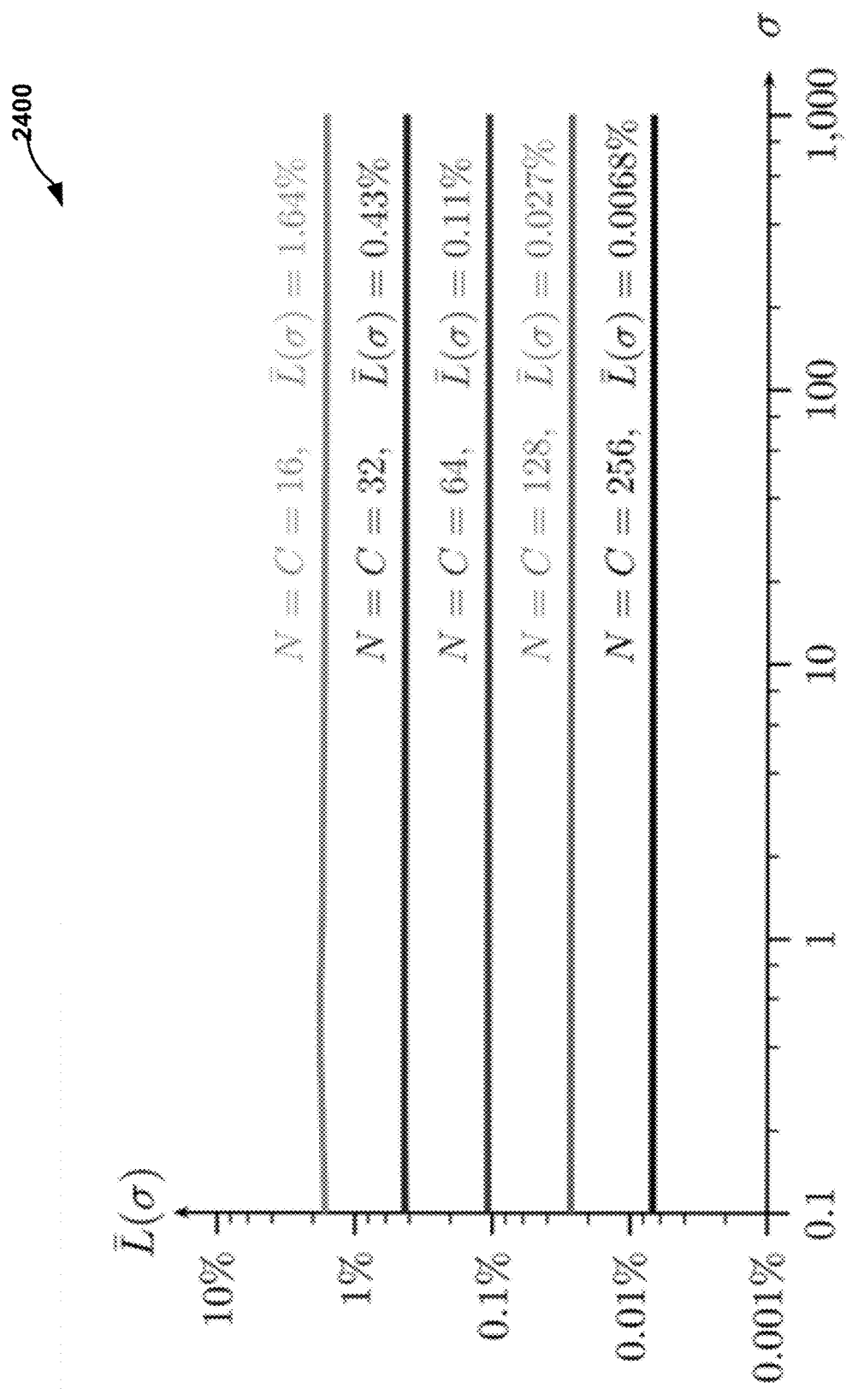
FIG. 24 illustrates example relative redundancy measures based on different numbers of code vectors using an example conversion function of the disclosure.

The solution arrays from Algorithm I and the ODE, represented as cubic splines defined using eqs. (26) or (27) for boundary derivatives were used to measure relative redundancy when interval [0, 1] was uniformly divided into N=C intervals (different from values of N used in Algorithm I). The results are shown in graph 2400 of FIG. 24, where it can be observed that the resulting average redundancies are indeed practically constant. FIG. 24 illustrates the relative redundancy incurred from using PDF parameter u and the conversion function of FIG. 22, dividing interval [0, 1] into N same size intervals (uniform quantization), and using C=N code vectors.

Furthermore, it is also shown in FIG. 24 that the average redundancy values quadruple when the interval sizes double, which is additional evidence that in a wide range of scales the redundancy curves of FIG. 20 are nearly quadratic, dominated by the curvature defined by eq. (25).

As another example, if the neural networks and entropy coding are designed assuming, instead of the normal (Gaussian), a Laplace distribution with PDF as follows:

$$p_\sigma(x) = \frac{e^{-\sqrt{2}|x|/\sigma}}{\sqrt{2}\,\sigma}, \quad (28)$$

then eq. (24) can be replace with the following:

$$\omega_n(\sigma) = \exp\left(\frac{n}{\sqrt{2}\,\sigma}\right), \quad (29)$$

$$\phi_n(\sigma) = \frac{d\omega_n(\sigma)}{d\sigma} = \frac{ne^{-n/(\sqrt{2}\,\sigma)}}{\sqrt{2}\,\sigma^2},$$

and use eqs. (25-27) to design the correspondingly optimal conversion functions.

As described above, it was assumed the codec designer would like to have the same maximum relative redundancy to always obtain the same overall average. It is possible to generalize the computation of the transformation function $T_{u\to\sigma}(u)$ to create a non-uniform distribution of relative redundancies.

Figure 25:
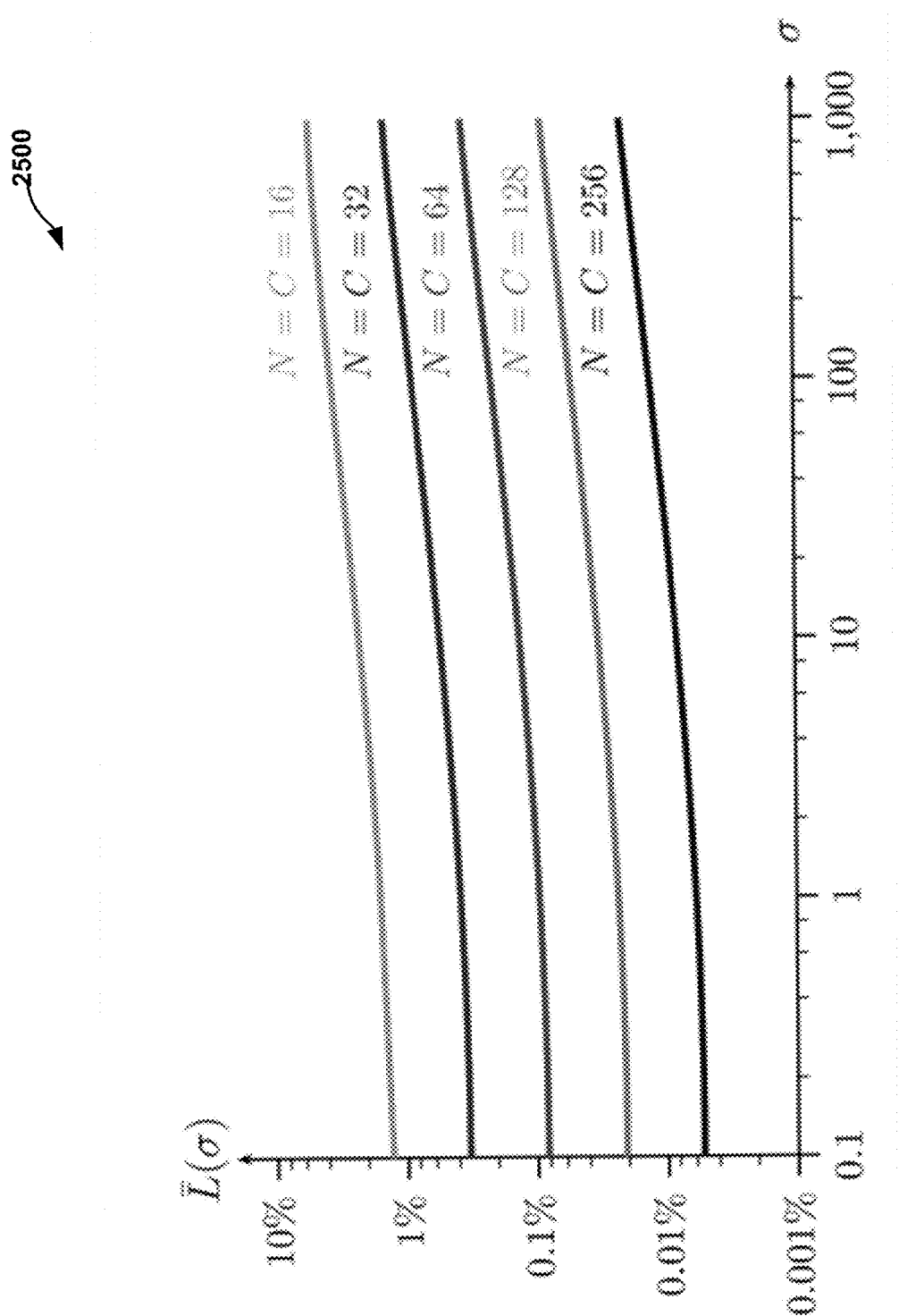
FIG. 25 illustrates example relative redundancy measures based on different numbers of code vectors using another example conversion function of the disclosure.
Figure 26:
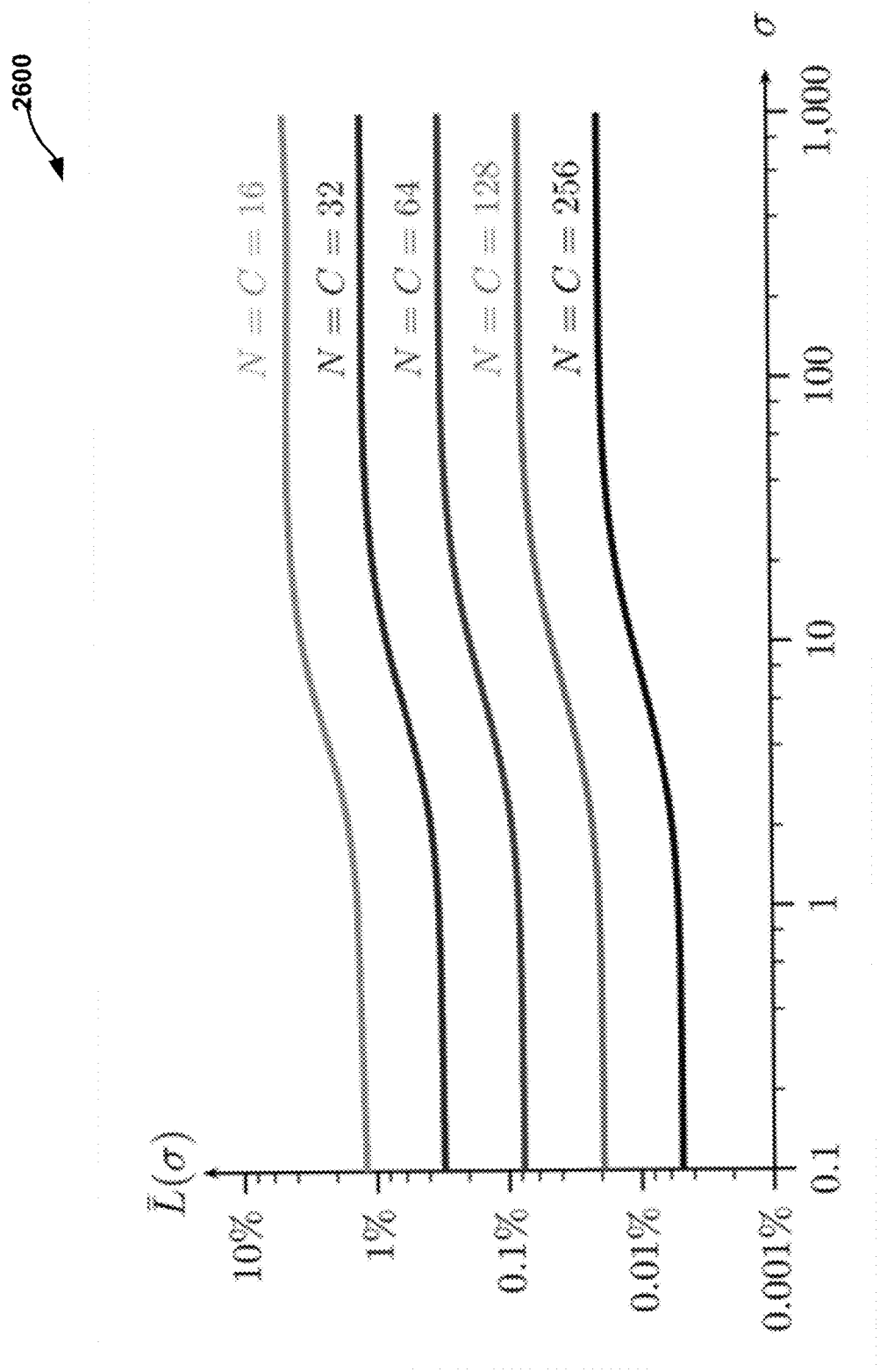
FIG. 26 illustrates example relative redundancy measures based on different numbers of code vectors using another example conversion function of the disclosure.

This can be done by replacing the constant $\epsilon$ in Algorithm I with a function $\epsilon(\sigma)$ that defines how the redundancy should vary with PDF parameter $\sigma$. Similarly, the constant k in the differential equations (26) and (27) can be replaced with a function $k(\sigma)$. FIGS. 25 and 26 show examples of results obtained using these modifications, with two types of function shaping the redundancy tolerance.

FIG. 25 illustrates a first set of examples 2500 of average relative redundancy incurred by uniform quantization of PDF parameter u using varying tolerance for redundancy. FIG. 26 illustrates a second set of examples 2600 of average relative redundancy incurred by uniform quantization of PDF parameter u using varying tolerance for redundancy.

The simplified codec of FIG. 21 only needs to compute the parameter conversion functions $T_{u\to\sigma}(u)$ during training of the neural networks, when its computational complexity may not be important. However, since gradients are often beneficial for neural network optimization, it may be better to use approximations that are continuous and have continuous first derivatives.

There are many mathematical methods defined for function approximations that can be used for approximating $T_{u\to\sigma}(u)$, like:
1. Polynomials
2. Rational polynomials
3. Piecewise polynomials
4. Splines One aspect to be considered while choosing an approximation is the fact that function $T_{u\to\sigma}(u)$ is in the limit defined by differential equations, so approximation errors should be measured by computing relative differences between the derivative of the approximation and the exact value defined by eqs. (26) or (27).

Figure 27:
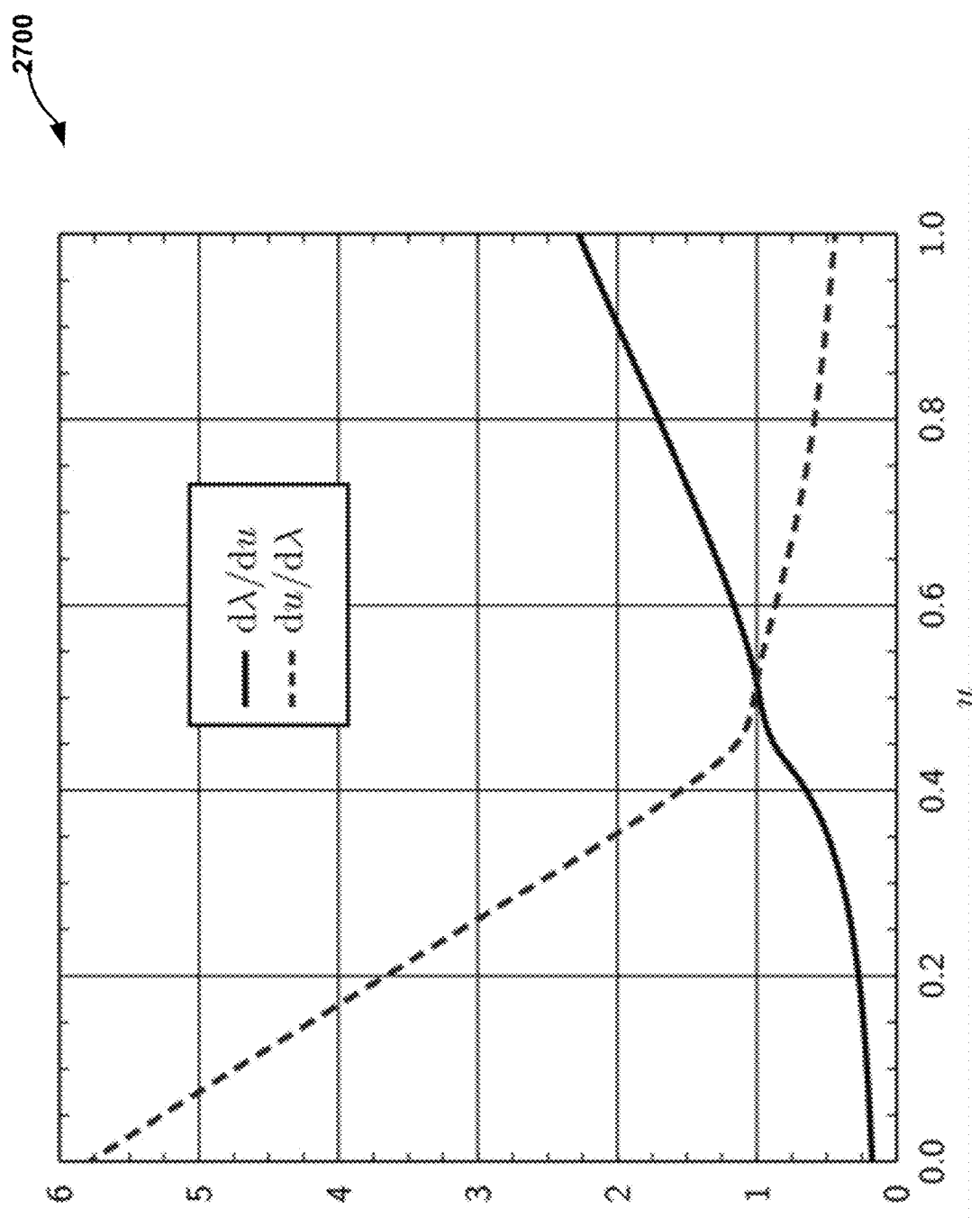
FIG. 27 illustrates a derivative of an example conversion function of the disclosure.

For example, in FIG. 22, it is shown that $\lambda \approx u^2$, which has derivative 2u. However, the desired derivative of $\lambda$ is shown in graph 2700 of FIG. 27, and we can see that the relative difference can be quite large for small values of u. FIG. 27 illustrates a derivative of the conversion function of FIG. 22 and its reciprocal.

Figure 28:
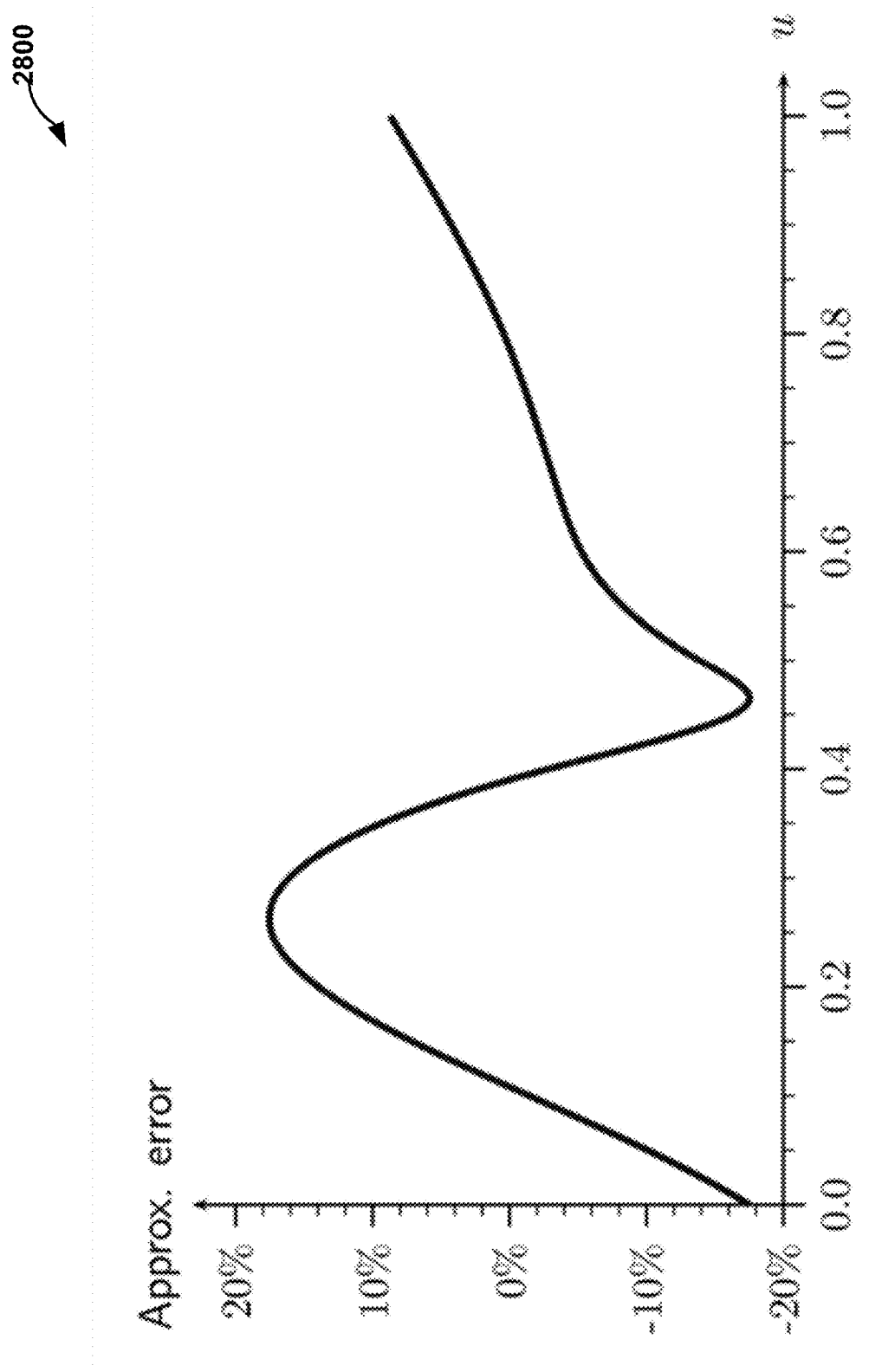
FIG. 28 illustrates a relative error of an example conversion function of the disclosure.
Figure 29:
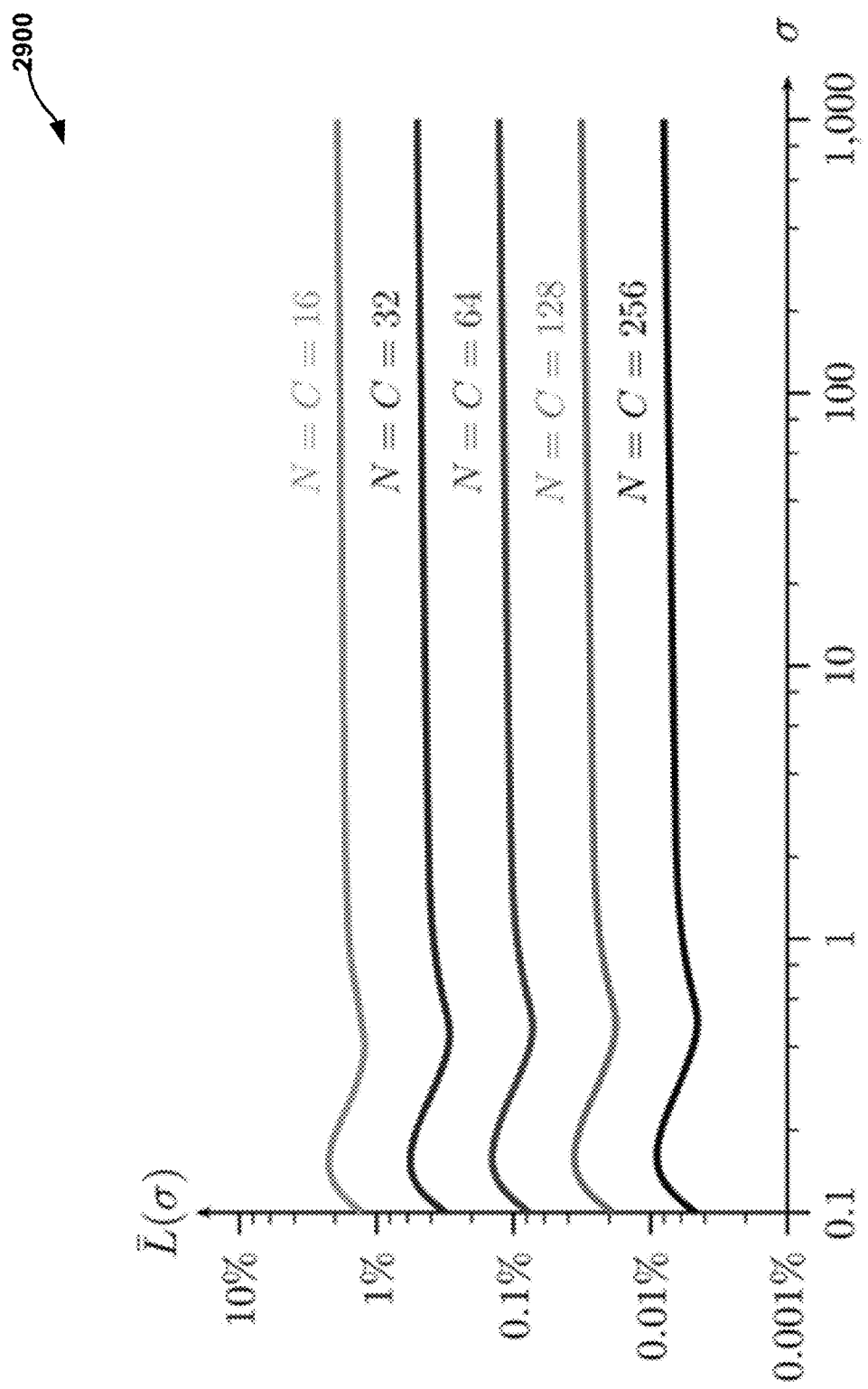
FIG. 29 illustrates example relative redundancy measures based on different numbers of code vectors using another example conversion function of the disclosure.

As another example, the third-degree polynomial approximation below:

$$\lambda(u) \approx 0.1425u + 0.2343u^2 + 0.6232u^3, \quad (30)$$

minimizes the maximum relative error on the derivative, which is shown in FIG. 28. FIG. 28 illustrates an example graph 2800 of the relative error of the PDF conversion function approximation using the 3rd-degree polynomial of eq. (30). Using this polynomial for parameter conversion results in the average redundancies shown in graph 2900 of FIG. 29. FIG. 29 illustrates the relative redundancy incurred by quantization of PDF parameter u, dividing interval [0, 1] into N same size intervals (uniform quantization), and using C=N code vectors and the approximation of eq. (30). It can be observed the correspondence between the peaks in FIG. 28, which are mapped to corresponding peaks in FIG. 29.

It can also be observed that relatively large relative derivative errors in FIG. 28 cause similar deviations on the maximum redundancy in FIG. 29, but they are smaller than the variations caused by halving N and C, meaning that functions as simple as the polynomial of eq. (30) can in fact be used in practical applications.

Other approximations include:

$$\lambda(u) \approx \frac{0.190379u - 0.291293u^2 + 1.3144u^3}{1 - 0.617269u + 0.830756u^2} \approx \quad (31)$$

$$0.192788u - 0.29643u^2 + 1.853472u^3 - 0.74983u^4 \approx$$

$$0.186278u - 0.13688u^2 + 1.075397u^3 + 0.568348u^4 - 0.693144u^5$$

The techniques of this disclosure may be implemented and tested using arithmetic coding and integrated into neural-based codecs running on a mobile device. In one example, the arithmetic coding techniques may be implemented using 32-bit operations, and the probability values may scaled to 16 bits.

Table 1 below shows some experimental results used to confirm the performance of the techniques of this disclosure. The hyperprior data was obtained using floating-point operations, so that only the quantization of entropy coding parameters affected the results.

As shown by the first row of results in Table 1, when the quantized PDF parameter $\sigma$ is used to parameterize the Gaussian PDF, about 0.5 Mbytes of memory is needed for storing 256 code vectors, and the obtained redundancy is what is expected from FIG. 11, approaching 1000%. Better results are possible, but would require much more memory for code vectors.

The following rows in Table 1 show that much better results are obtained when $\sigma$ is replace by quantized PDF parameter $v$ (e.g., a parameter obtained using a logarithmic function of $\sigma$, as defined by eq. (16). Using N=C=256 practically eliminates the redundancy, but the amount of memory for the code vectors is relatively high.

The results show that using smaller values of N=C helps to reduce the amount of memory needed, but the relative redundancy increases non-uniformly. On other hand, using the table look-up techniques described above, resulting in C<N=256 (e.g., less than 256 code vectors), about half the amount of memory is used with more consistent relative redundancy.

The last 3 rows of Table I show that using PDF parameter u and the conversion function of FIG. 22 also reduces memory requirements and provides the most consistent results, but without the need for table look-up.

TABLE 1

Experimental results obtained with the implementation of the techniques described herein, applied to data used in the compression of a Kodak dataset with 24 images.

| Quant. PDF param. | N | C | Memory (Kbytes) | Relative redundancy (%) @ bit rate | | | | |
|---|---|---|---|---|---|---|---|---|
| | | | | 0.25 bpp | 0.5 bpp | 1.0 bpp | 1.5 bpp | 2.5 bpp |
| $\sigma$ | 256 | 256 | 498.6 | 754.7 | 858.7 | 923.7 | 951.6 | 899.6 |
| v | 256 | 256 | 108.7 | 0.03 | 0.02 | 0.02 | 0.01 | 0.01 |
| v | 43 | 43 | 18.3 | 0.51 | 0.37 | 0.32 | 0.23 | 0.23 |
| v | 256 | 43 | 7.7 | 0.31 | 0.30 | 0.30 | 0.29 | 0.29 |
| v | 23 | 23 | 9.8 | 1.45 | 1.15 | 0.99 | 0.87 | 0.76 |
| v | 256 | 23 | 4.4 | 0.84 | 0.89 | 0.90 | 0.90 | 0.93 |
| u | 256 | 256 | 51.6 | 0.00 | 0.00 | 0.00 | 0.00 | 0.01 |
| u | 43 | 43 | 8.7 | 0.22 | 0.24 | 0.24 | 0.24 | 0.24 |
| u | 23 | 23 | 4.7 | 0.86 | 0.86 | 0.85 | 0.85 | 0.84 |

As shown above, for image and video coding using neural networks, selecting parameters for entropy coding that are most intuitive and convenient for the designers can work when using high-precision floating point implementation, but can cause serious degradation when the weights and activations of the neural networks are quantized. In fact, analysis of the commonly used Gaussian distributions shows that the worst degradation of compression efficiency (highest relative redundancy) occurs exactly for the most common cases obtained during compression.

The proposed techniques of this disclosure address the problem by re-defining the parameter used for entropy coding, preserving the training process with a single change of variables, but modifying the quantization to equalize the redundancy increase resulting from quantization. In addition, it is shown that, using the new parameterization, it is possible to reduce the amount of memory used for entropy coding using simple table look-up for code vector selection, or other types of parameter conversion functions without the use of table look-up.

Figure 30:
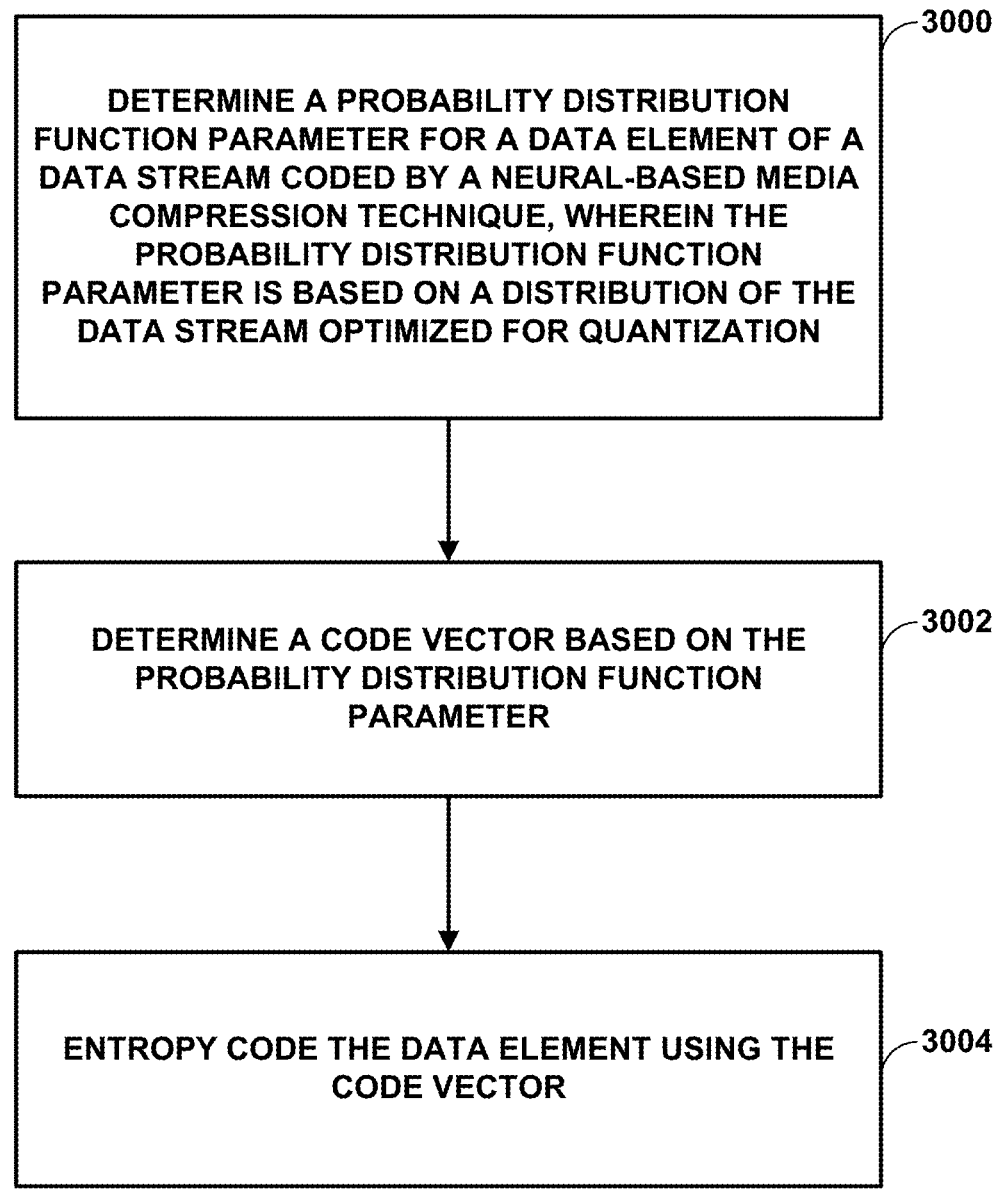
FIG. 30 is a flowchart illustrating an example method of the disclosure.

FIG. 30 is a flowchart illustrating an example method of the disclosure. The techniques of FIG. 30 may be performed by one or more components of media encoder 200 and/or media decoder 300, including the components shown in the example of FIG. 14. In example of FIG. 30, media encoder 200 and/or media decoder 300 may be configured to determine a probability distribution function parameter for a data element of a data stream coded by a neural-based media compression technique, wherein the probability distribution function parameter is based on a distribution of the data stream optimized for quantization (3000), determine a code vector based on the probability distribution function parameter (3002), and entropy code the data element using the code vector (3004). This function may be determined empirically (e.g., logarithmic) or by using an algorithm that evaluates coding redundancy or the solution of an ordinary differential equation.

Other Aspects of the disclosure are described below.

Aspect 1A—A method of coding media data, the method comprising: determining a probability distribution function parameter for a data element of a data stream coded by a neural-based media compression technique, wherein the probability distribution function parameter is a logarithmic function of a standard deviation of a probability distribution function of the data stream; determining a code vector based on the probability distribution function parameter; and entropy coding the data element using the code vector.

Aspect 2A—The method of Aspect 1A, further comprising: quantizing the probability distribution function parameter prior to determining the code vector.

Aspect 3A—The method of any of Aspects 1A-2A, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma=T_{u \to \sigma}(u)=T_{\lambda \to \sigma}(T_{u \to \lambda}(u))$, where $T_{\lambda \to \sigma}(\lambda)=\exp(\lambda \ln(\sigma_{max}/\sigma_{min})+\ln(\sigma_{min}))$, where functions T are defined according to an algorithm that measures coding redundancy or defined by solving an ordinary differential equation.

Aspect 4A—The method of any of Aspects 1A-3A, further comprising: generating the data element using the neural-based compression technique; and quantizing the data element to create a quantized data element, wherein entropy coding the data element using the code vector comprises entropy encoding the quantized data element using the code vector.

Aspect 5A—The method of Aspect 4A, wherein generating the data element using the neural-based compression technique comprises: processing an image or video picture using an image analysis neural network to generate the data element.

Aspect 6A—The method of any of Aspects 1A-3A, wherein entropy coding the data element using the code vector comprises entropy decoding an encoded data element using the code vector to create a quantized data element, the method further comprising: dequantizing the quantized data element to create a reconstructed data element.

Aspect 7A—The method of Aspect 6A, further comprising: processing the reconstructed data element using an image synthesis neural network to reconstruct an image or video picture.

Aspect 8A—An apparatus configured to code media data, the apparatus comprising: a memory; and one or more processors in communication with the memory, the one or more processors configured to: determine a probability distribution function parameter for a data element of a data stream coded by a neural-based media compression technique, wherein the probability distribution function parameter is a logarithmic function of a standard deviation of a probability distribution function of the data stream; determine a code vector based on the probability distribution function parameter; and entropy code the data element using the code vector.

Aspect 9A—The apparatus of Aspect 8A, wherein the one or more processors are further configured to: quantize the probability distribution function parameter prior to determining the code vector.

Aspect 10A—The apparatus of any of Aspects 8A-9A, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma=T_{u \to \sigma}(u)=T_{\lambda \to \sigma}(T_{u \to \lambda}(u))$, where $T_{\lambda \to \sigma}(\lambda)=\exp(\lambda \ln(\sigma_{max}/\sigma_{min})+\ln(\sigma_{min}))$, where functions T are defined according to an algorithm that measures coding redundancy or defined by solving an ordinary differential equation.

Aspect 11A—The apparatus of any of Aspects 8A-10A, wherein the one or more processors are further configured to: generate the data element using the neural-based compression technique; and quantize the data element to create a quantized data element, wherein entropy coding the data element using the code vector comprises entropy encoding the quantized data element using the code vector.

Aspect 12A—The apparatus of Aspect 11A, wherein to generate the data element using the neural-based compression technique, the one or more processors are further configured to: process an image or video picture using an image analysis neural network to generate the data element.

Aspect 13A—The apparatus of Aspect 12A, further comprising: a camera configured to capture the image or video picture.

Aspect 14A—The apparatus of any of Aspects 8A-10A, wherein entropy coding the data element using the code vector comprises entropy decoding an encoded data element using the code vector to create a quantized data element, and wherein the one or more processors are further configured to: dequantize the quantized data element to create a reconstructed data element.

Aspect 15A—The apparatus of Aspect 14A, wherein the one or more processors are further configured to: process the reconstructed data element using an image synthesis neural network to reconstruct an image or video picture.

Aspect 16A—The apparatus of Aspect 15A, further comprising: a display configured to display the image or video picture.

Aspect 17A—A non-transitory computer-readable storage medium storing instructions that, when executed, cause one or more processors to: determine a probability distribution function parameter for a data element of a data stream coded by a neural-based media compression technique, wherein the probability distribution function parameter is a logarithmic function of a standard deviation of a probability distribution function of the data stream; determine a code vector based on the probability distribution function parameter; and entropy code the data element using the code vector.

Aspect 18A—The non-transitory computer-readable storage medium of claim 17, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma=T_{u \to \sigma}(u)=T_{\lambda \to \sigma}(T_{u \to \lambda}(u))$, where $T_{\lambda \to \sigma}(\lambda)=\exp(\lambda \ln(\sigma_{max}/\sigma_{min})+\ln(\sigma_{min}))$, where functions T are defined according to an algorithm that measures coding redundancy or defined by solving an ordinary differential equation.

Aspect 1B—A method of coding media data, the method comprising: determining a probability distribution function parameter for a data element of a data stream coded by a neural-based media compression technique, wherein the probability distribution function parameter is a parameter of a distribution of the data stream optimized for quantization, determining a code vector based on the probability distribution function parameter; and entropy coding the data element using the code vector.

Aspect 2B—The method of Aspect 1B, further comprising: quantizing the probability distribution function parameter prior to determining the code vector.

Aspect 3B—The method of Aspect 1B, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to o}(u) = T_{\lambda \to o}(T_{u \to \lambda}(u))$, where $T_{\lambda \to o}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

Aspect 4B—The method of Aspect 1B, wherein the probability distribution function parameter is a function of a standard deviation of a probability distribution function of the data stream.

Aspect 5B—The method of Aspect 1B, further comprising: generating the data element using the neural-based compression technique; and quantizing the data element to create a quantized data element, wherein entropy coding the data element using the code vector comprises entropy encoding the quantized data element using the code vector.

Aspect 6B—The method of Aspect 5B, wherein generating the data element using the neural-based compression technique comprises: processing an image or video picture using an image analysis neural network to generate the data element.

Aspect 7B—The method of Aspect 6B, further comprising: capturing the image or video picture using a camera.

Aspect 8B—The method of Aspect 1B, wherein entropy coding the data element using the code vector comprises entropy decoding an encoded data element using the code vector to create a quantized data element, the method further comprising: dequantizing the quantized data element to create a reconstructed data element.

Aspect 9B—The method of Aspect 8B, further comprising:
processing the reconstructed data element using an image synthesis neural network to reconstruct an image or video picture.

Aspect 10B—The method of Aspect 9B, further comprising: displaying the image or the video picture.

Aspect 11B—An apparatus configured to code media data, the apparatus comprising: a memory; and one or more processors in communication with the memory, the one or more processors configured to: determine a probability distribution function parameter for a data element of a data stream coded by a neural-based media compression technique, wherein the probability distribution function parameter is a parameter of a distribution of the data stream optimized for quantization; determine a code vector based on the probability distribution function parameter; and entropy code the data element using the code vector.

Aspect 12B—The apparatus of Aspect 11B, wherein the one or more processors are further configured to: quantize the probability distribution function parameter prior to determining the code vector.

Aspect 13B—The apparatus of Aspect 11B, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to o}(u) = T_{\lambda \to o}(T_{u \to \lambda}(u))$, where $T_{\lambda \to o}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

Aspect 14B—The apparatus of Aspect 11B, wherein the probability distribution function parameter is a function of a standard deviation of a probability distribution function of the data stream;

Aspect 15B—The apparatus of Aspect 11B, wherein the one or more processors are further configured to: generate the data element using the neural-based compression technique; and quantize the data element to create a quantized data element, wherein entropy coding the data element using the code vector comprises entropy encoding the quantized data element using the code vector.

Aspect 16B—The apparatus of Aspect 15B, wherein to generate the data element using the neural-based compression technique, the one or more processors are further configured to: process an image or video picture using an image analysis neural network to generate the data element.

Aspect 17B—The apparatus of Aspect 16B, further comprising: a camera configured to capture the image or video picture.

Aspect 18B—The apparatus of Aspect 11B, wherein entropy coding the data element using the code vector comprises entropy decoding an encoded data element using the code vector to create a quantized data element, and wherein the one or more processors are further configured to: dequantize the quantized data element to create a reconstructed data element.

Aspect 19B—The apparatus of Aspect 18B, wherein the one or more processors are further configured to: process the reconstructed data element using an image synthesis neural network to reconstruct an image or video picture.

Aspect 20B—The apparatus of Aspect 19B, further comprising: a display configured to display the image or video picture.

Aspect 1C—A method of coding media data, the method comprising: determining a probability distribution function parameter for a data element of a data stream coded by a neural-based media compression technique, wherein the probability distribution function parameter is a parameter of a distribution of the data stream optimized for quantization, determining a code vector based on the probability distribution function parameter; and entropy coding the data element using the code vector.

Aspect 2C—The method of Aspect 1C, further comprising: quantizing the probability distribution function parameter prior to determining the code vector.

Aspect 3C—The method of any of Aspects 1C-2C, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to o}(u) = T_{\lambda \to o}(T_{u \to \lambda}(u))$, where $T_{\lambda \to o}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

Aspect 4C—The method of any of Aspects 1C-2C, wherein the probability distribution function parameter is a function of a standard deviation of a probability distribution function of the data stream.

Aspect 5C—The method of any of Aspects 1C-4C, further comprising: generating the data element using the neural-based compression technique; and quantizing the data element to create a quantized data element, wherein entropy coding the data element using the code vector comprises entropy encoding the quantized data element using the code vector.

Aspect 6C—The method of Aspect 5C, wherein generating the data element using the neural-based compression technique comprises: processing an image or video picture using an image analysis neural network to generate the data element.

Aspect 7C—The method of Aspect 6C, further comprising: capturing the image or video picture using a camera.

Aspect 8C—The method of any of Aspects 1C-4C, wherein entropy coding the data element using the code vector comprises entropy decoding an encoded data element using the code vector to create a quantized data element, the method further comprising: dequantizing the quantized data element to create a reconstructed data element.

Aspect 9C—The method of Aspect 8C, further comprising:
processing the reconstructed data element using an image synthesis neural network to reconstruct an image or video picture.

Aspect 10C—The method of Aspect 9C, further comprising: displaying the image or the video picture.

Aspect 11C—An apparatus configured to code media data, the apparatus comprising: a memory; and one or more processors in communication with the memory, the one or more processors configured to: determine a probability distribution function parameter for a data element of a data stream coded by a neural-based media compression technique, wherein the probability distribution function parameter is a parameter of a distribution of the data stream optimized for quantization; determine a code vector based on the probability distribution function parameter; and entropy code the data element using the code vector.

Aspect 12C—The apparatus of Aspect 11C, wherein the one or more processors are further configured to: quantize the probability distribution function parameter prior to determining the code vector.

Aspect 13C—The apparatus of any of Aspects 11C-12C, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to o}(u) = T_{\lambda \to o}(T_{u \to \lambda}(u))$, where $T_{\lambda \to o}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

Aspect 14C—The apparatus of any of Aspects 11C-12C, wherein the probability distribution function parameter is a function of a standard deviation of a probability distribution function of the data stream;

Aspect 15C—The apparatus of any of Aspects 11C-14C, wherein the one or more processors are further configured to: generate the data element using the neural-based compression technique; and quantize the data element to create a quantized data element, wherein entropy coding the data element using the code vector comprises entropy encoding the quantized data element using the code vector.

Aspect 16C—The apparatus of Aspect 15C, wherein to generate the data element using the neural-based compression technique, the one or more processors are further configured to: process an image or video picture using an image analysis neural network to generate the data element.

Aspect 17C—The apparatus of Aspect 16C, further comprising: a camera configured to capture the image or video picture.

Aspect 18C—The apparatus of any of Aspects 11C-14C, wherein entropy coding the data element using the code vector comprises entropy decoding an encoded data element using the code vector to create a quantized data element, and wherein the one or more processors are further configured to: dequantize the quantized data element to create a reconstructed data element.

Aspect 19C—The apparatus of Aspect 18C, wherein the one or more processors are further configured to: process the reconstructed data element using an image synthesis neural network to reconstruct an image or video picture.

Aspect 20C—The apparatus of Aspect 19C, further comprising: a display configured to display the image or video picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding media data, the method comprising:
   determining a probability distribution function parameter for a data element of a data stream coded by a neural-based media compression technique, wherein the probability distribution function parameter is based on a distribution of the data stream wherein the probability distribution function parameter is optimized for quantization,
   determining a code vector based on the probability distribution function parameter; and
   entropy coding the data element using the code vector.

2. The method of claim 1, further comprising:
   quantizing the probability distribution function parameter prior to determining the code vector.

3. The method of claim 1, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to \sigma}(u) = T_{\lambda \to \sigma}(T_{u \to \lambda}(u))$, where $T_{\lambda \to \sigma}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

4. The method of claim 1, wherein the probability distribution function parameter is a function of a standard deviation of a probability distribution function of the data stream.

5. The method of claim 1, further comprising:
   generating the data element using the neural-based compression technique; and
   quantizing the data element to create a quantized data element,
   wherein entropy coding the data element using the code vector comprises entropy encoding the quantized data element using the code vector.

6. The method of claim 5, wherein generating the data element using the neural-based compression technique comprises:
   processing an image or video picture using an image analysis neural network to generate the data element.

7. The method of claim 6, further comprising:
   capturing the image or video picture using a camera.

8. The method of claim 1, wherein entropy coding the data element using the code vector comprises entropy decoding an encoded data element using the code vector to create a quantized data element, the method further comprising:
   dequantizing the quantized data element to create a reconstructed data element.

9. The method of claim 8, further comprising:
   processing the reconstructed data element using an image synthesis neural network to reconstruct an image or video picture.

10. The method of claim 9, further comprising:
    displaying the image or the video picture.

11. An apparatus configured to code media data, the apparatus comprising:
    a memory; and
    one or more processors in communication with the memory, the one or more processors configured to:
       determine a probability distribution function parameter for a data element of a data stream coded by a neural-based media compression technique, wherein the probability distribution function parameter is based on a distribution of the data stream wherein the probability distribution function parameter is optimized for quantization;
       determine a code vector based on the probability distribution function parameter; and
       entropy code the data element using the code vector.

12. The apparatus of claim 11, wherein the one or more processors are further configured to:
    quantize the probability distribution function parameter prior to determining the code vector.

13. The apparatus of claim 11, wherein the probability distribution function parameter is u, the standard deviation of the probability distribution function is $\sigma$, a minimum standard deviation is $\sigma_{min}$, a maximum standard deviation is $\sigma_{max}$, and wherein the relationship between u and $\sigma$ is defined as: $\sigma = T_{u \to \sigma}(u) = T_{\lambda \to \sigma}(T_{u \to \lambda}(u))$, where $T_{\lambda \to \sigma}(\lambda) = \exp(\lambda \ln(\sigma_{max}/\sigma_{min}) + \ln(\sigma_{min}))$, where functions T are defined according to an algorithm that measures coding redundancy or defined by solving an ordinary differential equation.

14. The apparatus of claim 11, wherein the probability distribution function parameter is a function of a standard deviation of a probability distribution function of the data stream.

15. The apparatus of claim 11, wherein the one or more processors are further configured to:
    generate the data element using the neural-based compression technique; and
    quantize the data element to create a quantized data element,
    wherein entropy coding the data element using the code vector comprises entropy encoding the quantized data element using the code vector.

16. The apparatus of claim 15, wherein to generate the data element using the neural-based compression technique, the one or more processors are further configured to:
    process an image or video picture using an image analysis neural network to generate the data element.

17. The apparatus of claim 16, further comprising:
    a camera configured to capture the image or video picture.

18. The apparatus of claim 11, wherein entropy coding the data element using the code vector comprises entropy decoding an encoded data element using the code vector to create a quantized data element, and wherein the one or more processors are further configured to:

dequantize the quantized data element to create a reconstructed data element.

19. The apparatus of claim 18, wherein the one or more processors are further configured to:

process the reconstructed data element using an image synthesis neural network to reconstruct an image or video picture.

20. The apparatus of claim 19, further comprising:
a display configured to display the image or video picture.

\* \* \* \* \*